United States Patent
Han et al.

(10) Patent No.: US 12,430,736 B2
(45) Date of Patent: Sep. 30, 2025

(54) MOBILE ROBOT AND UNMANNED INSPECTION SYSTEM AND METHOD INCLUDING THE SAME

(71) Applicant: Samsung Electronics Co., Ltd., Suwon-si (KR)

(72) Inventors: Sang Kyeong Han, Suwon-si (KR); In Mo Jang, Suwon-si (KR); Kwang-Jun Kim, Suwon-si (KR); Hee Jae Park, Suwon-si (KR); Soon Wook Hwang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 82 days.

(21) Appl. No.: 18/523,973

(22) Filed: Nov. 30, 2023

(65) Prior Publication Data
US 2024/0281946 A1    Aug. 22, 2024

(30) Foreign Application Priority Data

Feb. 16, 2023 (KR) .................. 10-2023-0020757
Mar. 22, 2023 (KR) .................. 10-2023-0037296

(51) Int. Cl.
*H04N 23/695* (2023.01)
*G05D 1/648* (2024.01)
(Continued)

(52) U.S. Cl.
CPC ........... *G06T 7/0002* (2013.01); *G05D 1/648* (2024.01); *G06V 20/58* (2022.01); *H04N 23/695* (2023.01);
(Continued)

(58) Field of Classification Search
CPC ........ G06T 7/0002; G06T 2207/30232; G06T 2207/30261; G05D 1/648; G05D 2105/89;
(Continued)

(56) References Cited

U.S. PATENT DOCUMENTS

| 11,260,411 B2 | 3/2022 | González |
| 11,345,052 B1 | 5/2022 | Johnston et al. |

(Continued)

FOREIGN PATENT DOCUMENTS

| KR | 10-2004-0047134 A | 6/2004 |
| KR | 10-2015-0113694 A | 10/2015 |

(Continued)

*Primary Examiner* — Susan E. Hodges
(74) *Attorney, Agent, or Firm* — Muir Patent Law, PLLC

(57) ABSTRACT

A mobile robot includes a telescopic lift mounted on the outside of a main body of the mobile robot, the telescopic lift being extendable in a height direction; a first sensor package installed at an upper end of the telescopic lift; and a second sensor package installed at the upper end of the telescopic lift. The mobile robot is configured to collect information regarding an inspection target, which is installed at a high-altitude location on a particular floor level of a semiconductor fabrication plant, using the second sensor package, prevent the collision of the telescopic lift or the first sensor package of the mobile robot with the inspection target and/or stop the telescopic lift when the second sensor package collides with an object at the high-altitude location or with the inspection target, and conduct an unmanned inspection of the inspection target, including autonomously driving.

16 Claims, 23 Drawing Sheets

(51) Int. Cl.
*G06T 7/00* (2017.01)
*G06V 20/58* (2022.01)
*H04N 23/90* (2023.01)
*G05D 105/80* (2024.01)

(52) U.S. Cl.
CPC ......... *H04N 23/90* (2023.01); *G05D 2105/89* (2024.01); *G06T 2207/30232* (2013.01); *G06T 2207/30261* (2013.01)

(58) Field of Classification Search
CPC ........... G05D 2107/70; G05D 2109/10; G05D 1/225; G06V 20/58; H04N 23/695; H04N 23/90
USPC .......................................................... 348/82
See application file for complete search history.

(56) References Cited

U.S. PATENT DOCUMENTS

| | | | |
|---|---|---|---|
| 2011/0054690 A1 | 3/2011 | Gal | |
| 2018/0124326 A1* | 5/2018 | Irie | G03B 17/00 |
| 2021/0170583 A1 | 6/2021 | Edsinger et al. | |
| 2021/0310960 A1* | 10/2021 | Li | G05D 1/247 |
| 2021/0389257 A1* | 12/2021 | Liu | G01N 23/20008 |
| 2023/0013418 A1* | 1/2023 | Xu | G01S 15/93 |

FOREIGN PATENT DOCUMENTS

| | | | |
|---|---|---|---|
| KR | 10-2020-0048732 A | 5/2020 | |
| WO | WO-2024064129 A1 * | 3/2024 | |

* cited by examiner

360C

FIG. 13
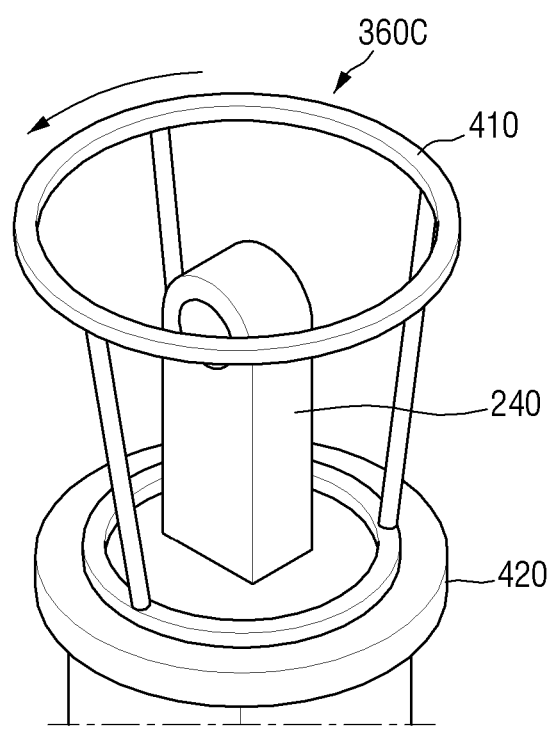
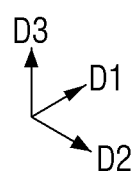

FIG. 14
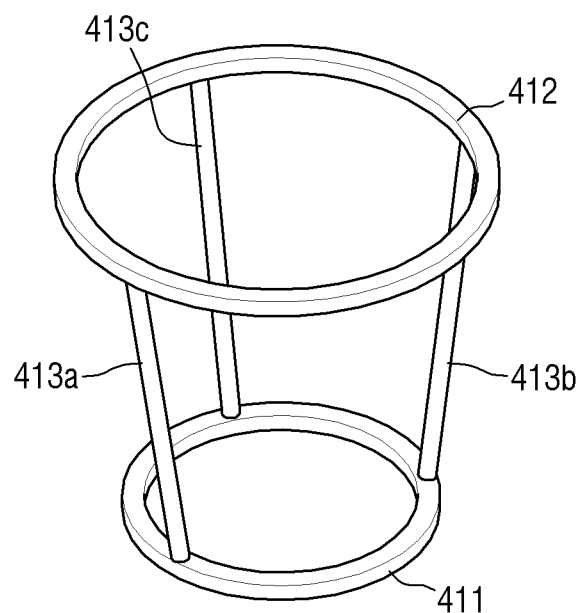
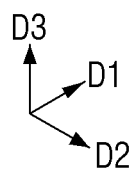

FIG. 16
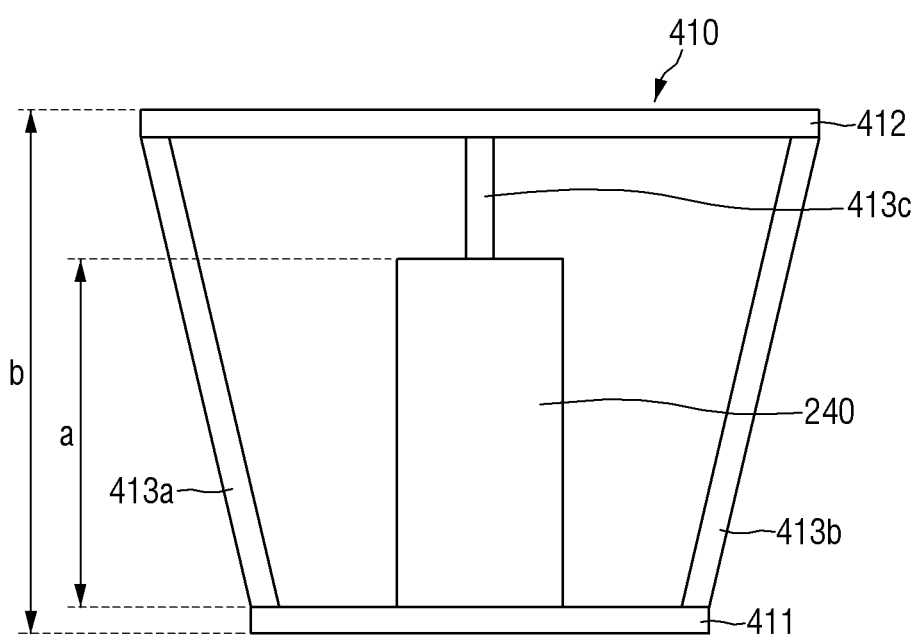
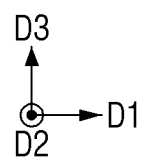

MOBILE ROBOT AND UNMANNED INSPECTION SYSTEM AND METHOD INCLUDING THE SAME

CROSS-REFERENCE TO RELATED APPLICATION

This application claims priority to Korean Patent Application No. 10-2023-0020757 and 10-2023-0037296 filed on Feb. 16, 2023 and Mar. 22, 2023, respectively, in the Korean Intellectual Property Office, the contents of which in their entirety are herein incorporated by reference.

BACKGROUND

1. Field

The present disclosure relates to a mobile robot and an unmanned inspection system including the same, and more particularly, a mobile robot for use at high-altitude in a semiconductor fabrication plant (commonly called a fab) and an unmanned inspection system including the mobile robot.

2. Description of the Related Art

A Clean Sub-Fab (CSF) and a Facility Sub-Fab (FSF) are located below a main fab. Various equipment and pipes are installed at the tops of the CSF and the FSF to supply liquids or gases necessary for semiconductor manufacturing processes.

In order to prevent unexpected equipment shutdown or human accidents, it is important to check facilities or pipes at high-altitude spots in the CSF and FSF for any problems such as leaks, rust, salt, etc., and inspection workers may regularly patrol the CSF and FSF to visually inspect such high-altitude spots from the ground. However, as inspection targets are at a height of about 2.5 m to 7.5 m from the ground, it is not easy to properly inspect the inspection targets with the naked eye.

SUMMARY

Aspects of the present disclosure provide a mobile robot capable of conducting an unmanned inspection at high-altitude in a Clean Sub Fab (CSF) and a Facility Sub Fab (FSF) and an unmanned inspection system including the mobile robot.

However, aspects of the present disclosure are not restricted to those set forth herein. The above and other aspects of the present disclosure will become more apparent to one of ordinary skill in the art to which the present disclosure pertains by referencing the detailed description of the present disclosure given below.

According to an aspect of the present disclosure, an unmanned inspection system includes a mobile robot configured to collect information regarding an inspection target, which mobile robot includes the ability to inspect high-altitude locations in a semiconductor fabrication plant; a first server configured to manage an inspection mission schedule of the mobile robot and to determine whether an emergency situation has occurred in the semiconductor fabrication plant based on the information collected by a high-altitude sensor of the mobile robot; and a worker terminal connected to the first server and configured to generate the inspection mission schedule. The mobile robot is configured to conduct an unmanned inspection of the inspection target, which is located at the high-altitude, while autonomously driving.

According to an aspect of the present disclosure, a mobile robot includes a telescopic lift mounted on the outside of a main body of the mobile robot, the telescopic lift being extendable in a height direction; a first sensor package installed at an upper end of the telescopic lift; and a second sensor package installed at the upper end of the telescopic lift. The mobile robot is configured to collect information regarding an inspection target, which is installed at a high-altitude location on a particular floor level of a semiconductor fabrication plant, using the second sensor package, prevent the collision of the telescopic lift or the first sensor package of the mobile robot with the inspection target and/or stop the telescopic lift when the second sensor package collides with an object at the high-altitude location or with the inspection target, and conduct an unmanned inspection of the inspection target, including autonomously driving.

According to an aspect of the present disclosure, an unmanned inspection method includes: collecting information, by a mobile robot, regarding an inspection target that is installed at a high-altitude location in a semiconductor fabrication plant; managing by a first server an inspection mission schedule of the mobile robot and determining whether an emergency situation has occurred in the semiconductor fabrication plant based on the information collected by the mobile robot; and generating the inspection mission schedule using a worker terminal. The mobile robot conducts an unmanned inspection of the inspection target by autonomously driving, the first server determines the presence of potential risks in each zone of the semiconductor fabrication plant based on the information collected by the mobile robot and determines whether the emergency situation has occurred depending on the presence of the potential risks, and the mobile robot patrols the inside of the semiconductor fabrication plant by using a first sensor package mounted on the end of a telescopic lift controlled by a controller of the mobile robot, the first sensor package surrounded by a bumper sensor frame connected to a second sensor package configured to detect a collision between the bumper sensor frame and an object at the high-altitude and send a signal indicating the collision to the controller.

BRIEF DESCRIPTION OF THE DRAWINGS

These and/or other aspects will become apparent and more readily appreciated from the following description of the embodiments, taken in conjunction with the accompanying drawings in which:

FIG. 13 is a perspective view illustrating the operating principle of the bumper sensor frame 410 of the contact sensor assembly 360C according to an embodiment of the present disclosure.

FIG. 14 is a perspective view illustrating the structure of the bumper sensor frame 410 of the contact sensor assembly 360C according to an embodiment of the present disclosure.

FIG. 16 is a schematic view for comparing the first sensor package 240 and the contact sensor assembly 360C of the second sensor package 250 according to an embodiment of the present disclosure.

DETAILED DESCRIPTION

Figure 1:
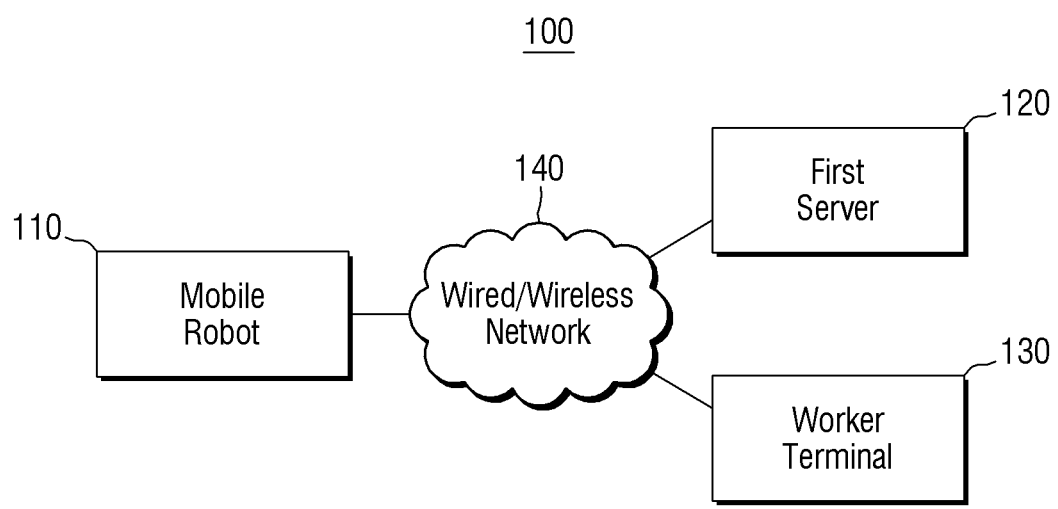
FIG. 1 is a block diagram of an unmanned inspection system according to an embodiment of the present disclosure.

Hereinafter, exemplary embodiments of the present disclosure will be described in detail with reference to the accompanying drawings. The same components in the drawings will be denoted by the same reference numerals, and an overlapping description thereof will be omitted.

The present disclosure relates to a mobile robot capable of inspecting equipment or pipes installed at high-altitude in a semiconductor fabrication plant (commonly called a fab) and an unmanned inspection system including the mobile robot.

Inspection workers regularly patrol and inspect equipment or pipes installed at the top of a Clean Sub Fab (CSF) or a Facility Sub Fab (FSF) for problems such as liquid/gas leakage and corrosion. However, there is a clear limit in visually inspecting inspection targets located at high-altitude, for example, at a height of 2.5 m to 7.5 m from the floor.

The workers may use a ladder to inspect equipment or pipes located at high-altitude. In these situations, the inspection by a worker could not be carried out without the use of a ladder or similar equipment. This type of inspection is classified as high-altitude work and is considered dangerous. Also, as the inspection targets are generally widely distributed throughout the CSF or FSF, it may take a considerable amount of time to complete the inspection. Also, repeated high-altitude work may put the workers at the risk of musculoskeletal disorders or even serious injuries and fatalities in case of accidents such as, for example, gas leaks from pipes.

The workers may inspect equipment or pipes at high-altitude by capturing images with cameras on tripods. However, as the workers need to carry and reinstall the cameras and the tripods as they move around from one inspection site to another inspection site, the inspection of the inspection targets may be delayed.

In order to address these and other problems, the present disclosure presents an unmanned inspection system characterized by using a mobile robot to inspect equipment or pipes installed at high-altitude in a fab. The mobile robot and the unmanned inspection system including the mobile robot may be applicable to, for example, to the inspection of high-altitude spots in a CSF or FSF. Embodiments of the present disclosure will hereinafter be described with reference to the accompanying drawings.

FIG. 1 is a block diagram of an unmanned inspection system according to a first embodiment of the present disclosure.

Referring to FIG. 1, an unmanned inspection system 100 is a system for an unmanned inspection of high-altitude in a fab. The unmanned inspection system 100 may perform diagnostic inspection and emergency response work in a fab based on artificial intelligence. In a normal situation, the unmanned inspection system 100 may perform an unmanned patrol function for the diagnostic inspection of equipment, pipes, and environments inside a fab. In an emergency situation, the unmanned inspection system 100 may perform an emergency response function of quickly moving to a site where an accident has occurred in the fab and transmitting, in real time, information on the accident and the surroundings to the control system of an integrated disaster prevention/management room. A general situation (e.g., a normal situation) will be described below with reference to FIG. 1, and an emergency situation will be described later with reference to FIG. 24.

The unmanned inspection system 100 may include a mobile robot 110, a first server 120, and a worker terminal 130.

The mobile robot 110 may collect information regarding an inspection target at a high-altitude spot. The mobile robot 110 may be placed at an inspection site where the inspection target is located, and may collect information regarding the inspection target while autonomously driving across the inspection site. The mobile robot 110 may collect images of the inspection target and the temperature, the humidity, and the intensity of illumination of the inspection site as the information regarding the inspection target. Other information may be gathered as well, such as wind velocity, pressure, or other measurable physical characteristics.

The high-altitude spot may be, for example, the top of a CFS or the top of an FSF. The inspection target may be, for example, equipment or pipes installed at the ceiling of a CSF or an FSF (e.g., the pipes or equipment themselves, or a region below the pipes or equipment, between the pipes or equipment, or above the pipes or equipment). Examples of the images of the inspection target may include images obtained via a camera sensor, an infrared sensor, and an ultrasonic sensor.

The mobile robot 110 may be provided as a robot system capable of sensing facilities, pipes, and the environment in a fab while autonomously driving. Multiple mobile robots 110 may be provided in the fab, but the present disclosure is not limited thereto. Alternatively, only one mobile robot 110 may be provided in the fab.

The first server 120 processes information collected by the mobile robot 110. The first server 120 may communicate with the mobile robot 110 to acquire the information collected by the mobile robot 110. The first server 120 may communicate with the mobile robot 110 in a wireless manner, but the present disclosure is not limited thereto. Alternatively, the first server 120 may communicate with the mobile robot 110 in a wired manner. The first server 120, unlike the mobile robot 110, may not be placed at the inspection site, but may operate at a remote location from the inspection site. An existing wired or wireless network may be used to connect between a communication device at the inspection site that communicates with the mobile robot 110 (e.g., via a wireless connection) and the first server 120.

The first server 120 manages the mission schedule of the mobile robot 110. For example, the first server 120 may manage an inspection target list, the location of each listed inspection target, a route to each listed inspection target, and a schedule regarding when to inspect each listed inspection target. The first server 120 may provide these data to the mobile robot 110 when each listed inspection target needs to be inspected.

The first server 120 may control the mobile robot 110 to collect and acquire information at the inspection site. The mobile robot 110 may collect information regarding the inspection target at the inspection site under the control of the first server 120 and may provide the collected information to the first server 120.

The first server 120 may include one or more modules associated with functions or operations for controlling the mobile robot 110. The modules may be provided as applications or programs and may be implemented as instructions stored in a computer-readable recording medium (e.g., a memory or a database). When the instructions are executed by a processor, functions corresponding to the instructions may be performed. The instructions may include code generated by a compiler or code that can be executed by an interpreter.

The first server 120 may be provided as a computing device communicating with the mobile robot 110 via a wired/wireless network 140 to process information or provide data. For example, the first server 120 may be provided as various types of servers such as a web server, an application server, a database management server, a security management server, a communication server, or a terminal server. The first server 120 may be provided as a server-type computing device, but the present disclosure is not limited thereto. For example, the first server 120 may be provided as any type of computing device as long as it can perform a processor function, a storage function, a communication function, and the like. For example, the first server 120 may be provided as a computing device such as a smartphone, a notebook computer, a desktop personal computer (PC), a tablet PC, a laptop computer, a netbook computer, a personal digital assistant (PDA), or a slate PC. The first server 120 may operate in a centrally managed data storage environment, but the present disclosure is not limited thereto. Alternatively, the first server 120 may operate in a distributed data storage environment.

The worker terminal 130, which is a terminal accessed by a worker, may create and modify the mission schedule of the mobile robot 110 based on information input by the worker. The worker terminal 130 may be provided as a notebook computer or a desktop PC, but the present disclosure is not limited thereto. Alternatively, the worker terminal 130 may be provided as a mobile terminal such as a smartphone or as an electronic device such as a tablet PC, a laptop computer, a netbook terminal, a PDA, a slate PC, or a wearable device. The worker terminal 130 and server 120 may be the same electronic device in some embodiments (e.g., same tablet, PC, laptop computer, etc.). In some embodiments, the worker terminal 130, like the first server 120, may not be placed at the inspection site, but may operate at a remote location from the inspection site.

The worker terminal 130 may access the first server 120 to create and modify the mission schedule of the mobile robot 110. The worker terminal 130 may create and modify the mission schedule of the mobile robot 110 in an environment provided by the first server 120. The worker terminal 130 may create and modify the mission schedule of the mobile robot 110 without accessing the first server 120. The worker terminal 130 may create or modify the mission schedule of the mobile robot 110 and may then provide the created or modified mission schedule to the first server 120. The worker terminal 130 may perform some or all of these tasks based on input from a user, and/or may perform some or all of these tasks automatically.

The worker terminal 130 may perform both the function of creating a mission schedule and the function of modifying a mission schedule, but the present disclosure is not limited thereto. Alternatively, the worker terminal 130 may perform only one of the function of creating a mission schedule and the function of modifying a mission schedule, in which case, the first server 120 may perform the other function not performed by the worker terminal 130. Alternatively, the first server 120 may perform at least one of the function of creating a mission schedule and the function of modifying a mission schedule, regardless of whether the worker terminal 130 performs the function of creating a mission schedule, the function of modifying a mission schedule, or both.

The wired/wireless network 140 is for connecting the mobile robot 110, the first server 120, and the worker terminal 130 in a wired or wireless manner. The wired/wireless network 140 may be provided as an Internet-based communication network, a mobile communication network, or a local area network (LAN). Alternatively, the wired/wireless network 140 may be provided as a base station communication network such as a Code Division Multiple Access (CDMA) network, a Time Division Multiple Access (TDMA) network, a Frequency Division Multiple Access (FDMA) network, a Global System for Mobile communications (GSM) network, a Long Term Evolution (LTE) network, a Long Term Evolution-Advanced (LTE-A) network. Alternatively, the wired/wireless network 140 may be provided as a satellite communication network such as a Global Positioning System (GPS) network. However, the present disclosure is not limited to these examples, and the wired/wireless network 140 may be provided as any type of network as long as it can allow the mobile robot 110, the first server 120, and the worker terminal 130 to communicate with one another in a wired or wireless manner.

Figure 2:
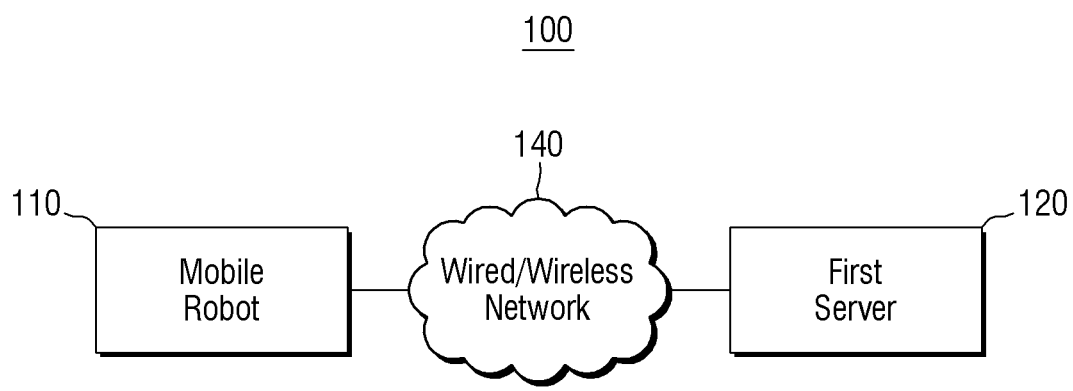
FIG. 2 is a block diagram of an unmanned inspection system according to an embodiment of the present disclosure.

In some embodiments, the first server 120 may perform the functions of the worker terminal 130. In this case, referring to FIG. 2, the unmanned inspection system 100 may not include the worker terminal 130. FIG. 2 is a block diagram of an unmanned inspection system according to an embodiment of the present disclosure.

Figure 3:
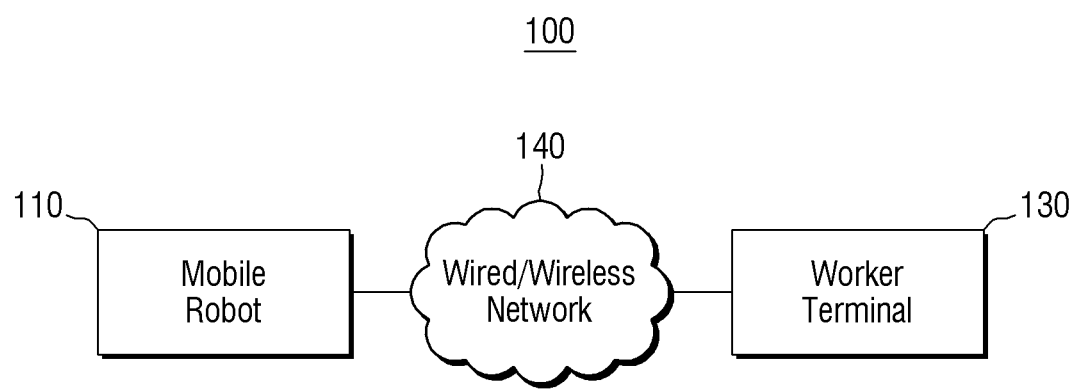
FIG. 3 is a block diagram of an unmanned inspection system according to an embodiment of the present disclosure.

In some embodiments, the worker terminal 130 may perform the functions of the first server 120. In this case, referring to FIG. 3, the unmanned inspection system 100 may not include the first server 120. FIG. 3 is a block diagram of an unmanned inspection system according to an embodiment of the present disclosure.

The mobile robot 110 may include a telescopic lift, a diagnostic inspection sensor unit, a height safety sensor unit, a robot-mounted anomaly detection processor, and a robot-side communication unit.

The telescopic lift is mounted on the outside of the robot body of the mobile robot 110 and may be formed to be height-extendable. The telescopic lift will be described later.

The diagnostic inspection sensor unit may inspect the environment, facilities, or pipes in the fab. The diagnosis inspection sensor unit may obtain on-site information in response to an emergency. The diagnostic inspection sensor unit may be mounted at the upper end of the telescopic lift or on the outside of the robot body of the mobile robot 110. As will be described later, the diagnostic inspection sensor unit may be provided as a first sensor package.

The height safety sensor unit may prevent the telescopic lift from colliding with equipment or pipes at high-altitude, or may stop the telescopic lift upon collision. The height safety sensor unit may be mounted at the upper end of the telescopic lift or on the outside of the robot body of the mobile robot 110. As will be described later, the height safety sensor unit may be provided as a second sensor package.

The robot-mounted anomaly detection processor may perform anomaly detection based on information acquired by the diagnostic inspection sensor unit, using an information processing function. As will be described later, the robot-mounted anomaly detection processor may be included in a controller.

The robot-side communication unit is for communicating with the first server 120. The robot-side communication unit may transmit the result of diagnostic inspection/sensing performed by the mobile robot 110, real-time status information of the mobile robot 110, and field information to the first server 120 via an indoor wireless communication network infrastructure where the mobile robot 110 is disposed, in order to notify the server of its inspection/sensing results.

Figure 4:
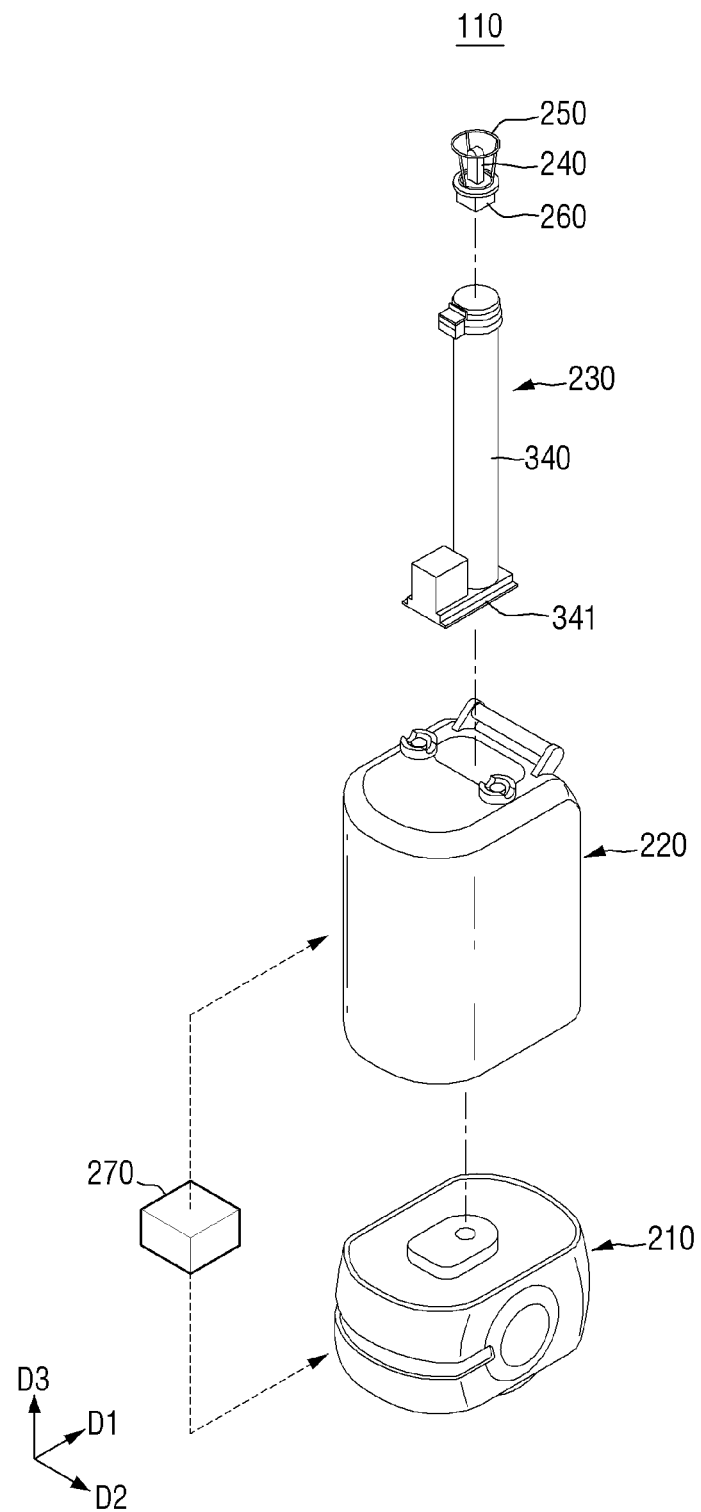
FIG. 4 is an exploded perspective view of a mobile robot of an unmanned inspection system according to an embodiment of the present disclosure.
Figure 5:
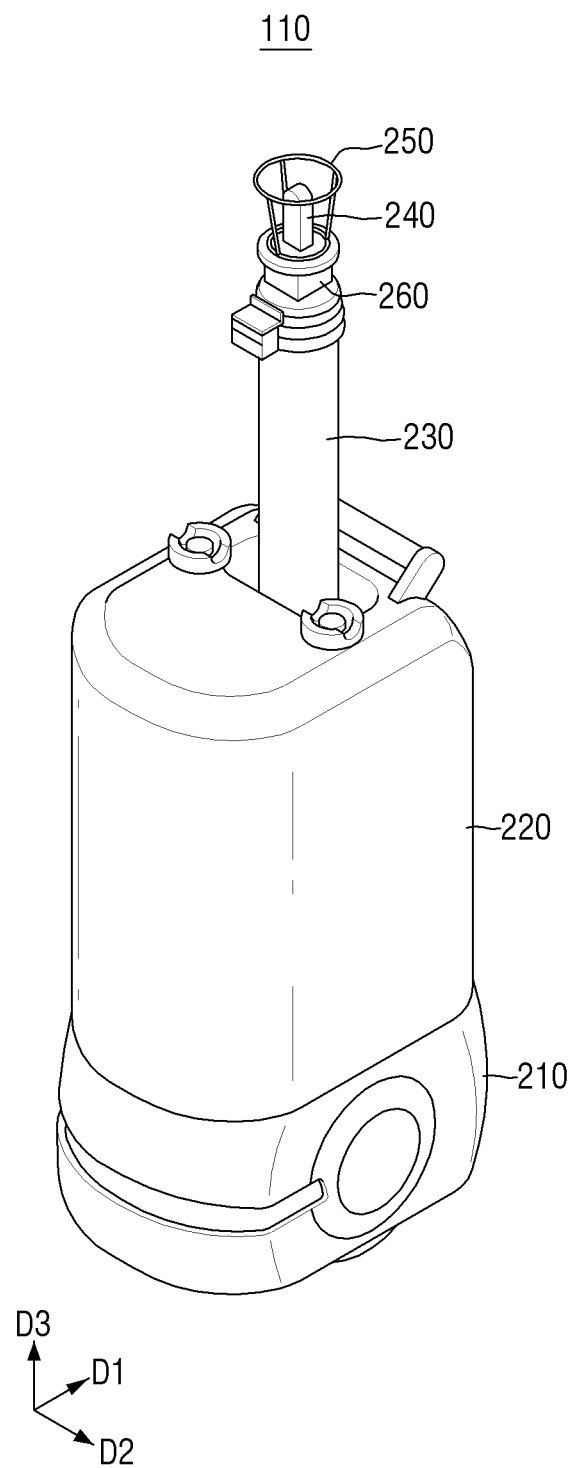
FIG. 5 is a combined perspective view of the mobile robot of FIG. 4.

The mobile robot 110 will hereinafter be described in further detail. FIG. 4 is an exploded perspective view of a mobile robot of an unmanned inspection system according to an embodiment of the present disclosure. FIG. 5 is a combined perspective view of the mobile robot of FIG. 4.

Referring to FIGS. 4 and 5, the mobile robot 110 is an inspection robot for a safe inspection of high-altitude sites in a fab. High-altitude as used in this specification refers to a height on a particular building floor level of a fab (e.g., a height above a floor on a particular floor level of the fab) that cannot be easily inspected by a human without the use of an elevating device such as a ladder or stool, for example, a height above about 2.5 meters. Inspection of high-altitude sites may include inspection of pipes and other objects connected to a ceiling within a fab, which objects are too high above the floor to be easily inspected by a human with the use of an elevating device. A "floor" as used herein refers to a bottom platform of a room, on which workers stand and the mobile robot travels. A "floor level" refers to a particular level in the building, as would be typically be described as a ground floor, first floor, second floor, basement, etc. Referring to FIGS. 4 and 5, the mobile robot 110 may include a driving unit 210, a cover 220, a lifting unit 230, a first sensor package 240, a second sensor package 250, a pan-tilt unit 260, and a controller 270.

The driving unit 210 is provided for the autonomous driving of the mobile robot 110. The driving unit 210, also described as a mobile robot driver, may include a driving device such as a motor and one or more wheels, and may be coupled to a lower part of the cover 220.

Before an unmanned inspection mission, the mobile robot 110 may acquire map information regarding an inspection site, for example using a Simultaneous Localization and Mapping (SLAM) function. Thereafter, the mobile robot 110 may set the inspection target at the inspection site and the location (or inspection coordinates) of the inspection target. The SLAM function may be stored in a memory included in the controller 270 and may be performed by the controller 270.

In response to receipt of a request for an unmanned inspection mission, the mobile robot 110 may autonomously drive along a predefined driving path. Alternatively, the mobile robot 110 may be controlled via an on-site wireless network by a worker who accesses the worker terminal 130. The mobile robot 110 may move to a desired location, as a one-off event, under the control of the worker terminal 130.

The cover 220 may be coupled to an upper part of the driving unit 210. Various elements of the mobile robot 110 may be disposed in the cover 220. For example, the lifting unit 230 may be disposed in the cover 220. The controller 270 may also be disposed in the cover 220.

Figure 6:
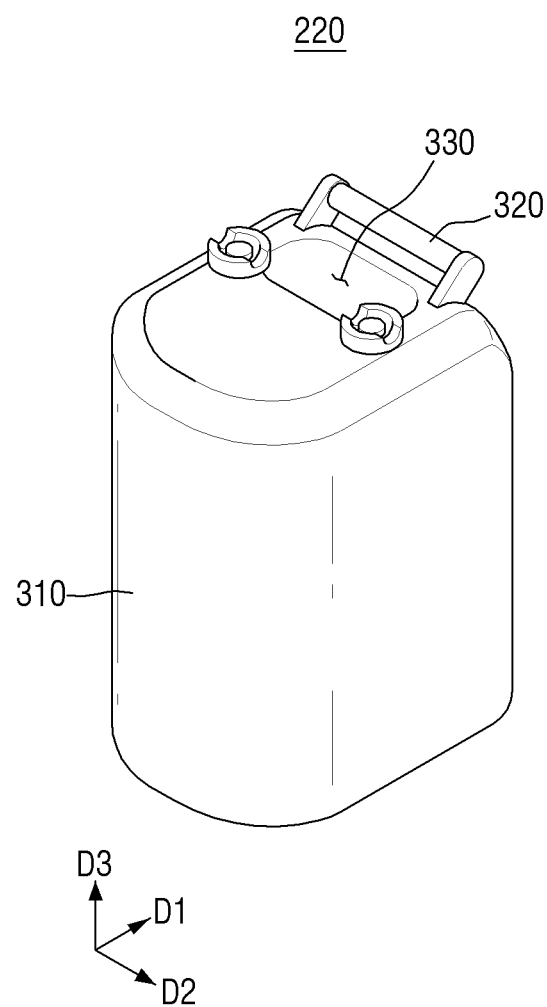
FIG. 6 is a perspective view of the cover 220 of the mobile robot 110 according to an embodiment of the present disclosure.

Referring to FIG. 6, the cover 220 may include a main body 310 and a handle 320, which is provided on one side of the main body 310. An upper part of the main body 310 may include an opening 330, which exposes at least part of the lifting unit 230 to allow at least part of the lifting unit 230 to pass therethrough. FIG. 6 is a perspective view of the cover 220 of the mobile robot 110.

Referring again to FIGS. 4 and 5, the lifting unit 230 is lifted up to inspect a high-altitude spot at the inspection site. The lifting unit 230 may include, for example, a telescopic lift 340 and a support member 341. The support member 341 may support the telescopic lift 340 and may include, for example, a base for mounting on the driving unit, and a motor, to control the operation of the telescopic lift 340. The support member 341 may be described simply as a lift mount, a lift support, or a lift actuator. Though a motor is described, other devices that cause extension of the telescopic lift 340, such hydraulics, for example, may be used.

The telescopic lift 340 may be extended or shortened in stages under the control of the support member 341 and may be lifted up in a vertical direction D3 accordingly. The first sensor package 240, the second sensor package 250, and the pan-tilt unit 260 may be coupled to an upper part of the lifting unit 230.

Figure 7:
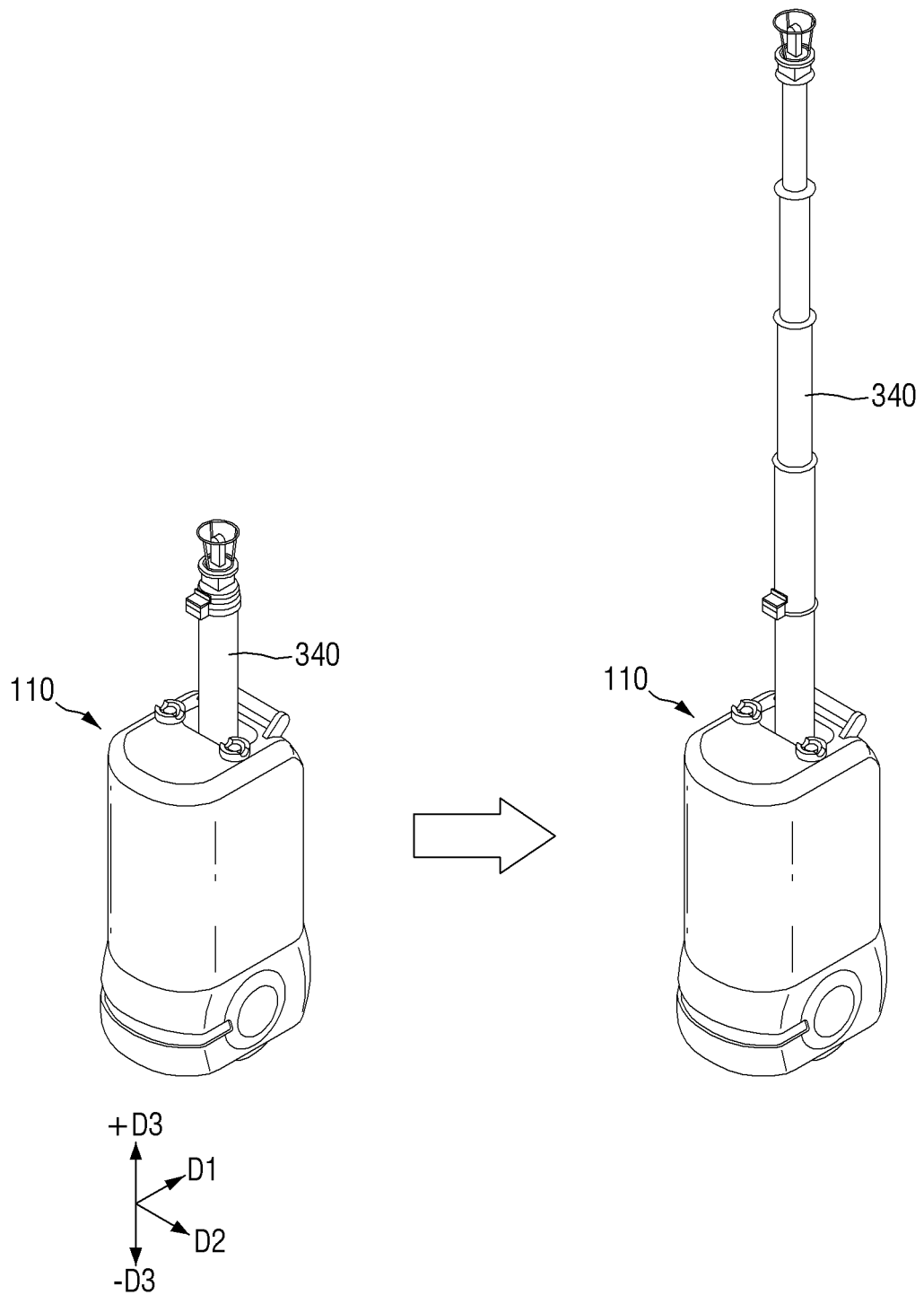
FIG. 7 is a perspective view illustrating an operation of the lifting unit 230 according to an embodiment of the present disclosure.

The telescopic lift 340, also described as a lifting arm or lifting cylinder, may be extended and lifted up in an upward direction +D3 to allow the first and second sensor packages 240 and 250 to approach the inspection target. Referring to FIG. 7, the telescopic lift 340 may be extended and lifted up in the upward direction +D3. The first and second sensor packages 240 and 250 may be able to approach the inspection target due to the telescopic lift 340 and may then collect information regarding the inspection target. FIG. 7 is a perspective view illustrating an operation of the lifting unit 230.

Figure 8:
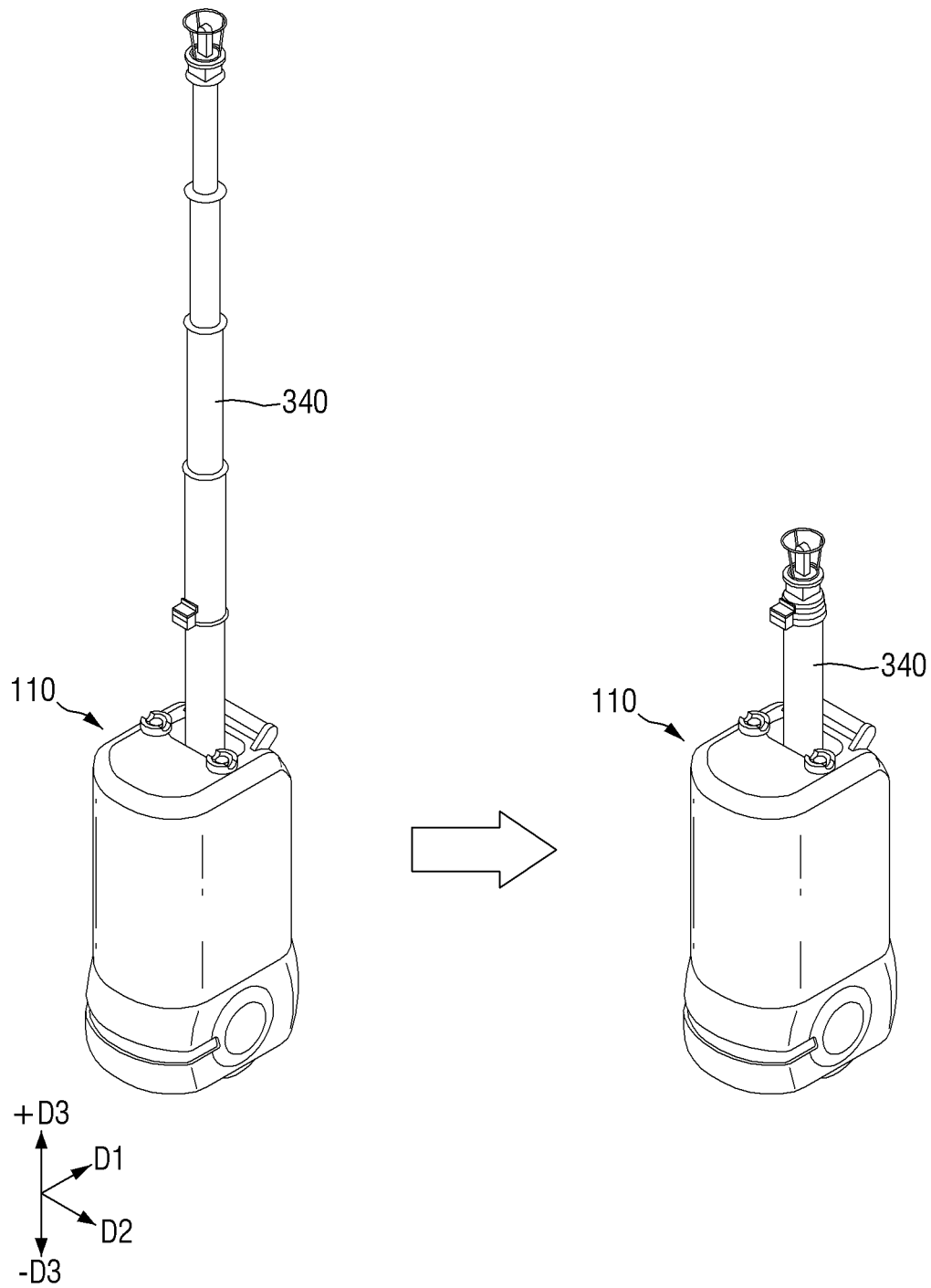
FIG. 8 is a perspective view illustrating an operation of the lifting unit 230 according to an embodiment of the present disclosure.

When the collection of information by the first and second sensor packages 240 and 250 is complete, the lifting unit 230 may be shortened and lifted down in a downward direction −D3. Referring to FIG. 8, the telescopic lift 340 may be shortened and lifted down in the downward direction −D3. FIG. 8 is a perspective view illustrating an operation of the lifting unit 230.

The telescopic lift 340 may be exposed to the outside through the opening 330 of the cover 220. For a smooth lifting operation, the telescopic lift 340 may not be disposed on the inside of the cover 220, but may be exposed on the outside of the cover 220 (e.g., even at its smallest length, it may pass through the opening 330 to the outside of the cover 220), but the present disclosure is not limited thereto. Alternatively, the telescopic lift 340 may be disposed in the cover 220 when at it's smallest length, and may be lifted up or down through the opening 330. In this embodiment, the opening 330 may include a door that can be closed when the telescopic lift 340 is fully retracted.

Referring again to FIGS. 4 and 5, the first sensor package 240 is for collecting information regarding the inspection target. The first sensor package 240 may include sensors used for an inspection mission and may include a plurality of inspection sensors of different types. The first sensor package 240 may be fixedly or detachably mounted at an upper end of the telescopic lift 340 or on the outside of the main body 310.

For example, the first sensor package 240 may include a camera sensor, an infrared sensor, and an ultrasonic sensor. The camera sensor, which is for capturing images of the inspection target (e.g., capturing visible light), may include a fixed sensor or a movable/rotational sensor. The fixed sensor may include, for example, a real image camera or a red-green-blue (RGB) camera. The movable/rotational sensor may include, for example, a 360-degree camera. The infrared sensor and the ultrasonic sensor, like the camera sensor, are for capturing images of the inspection target. The infrared sensor may include, for example, a thermal imaging camera. The ultrasonic sensor may include, for example, an ultrasonic camera.

The first sensor package 240 may further include a plurality of inspection sensors collecting different types of information. For example, the first sensor package 240 may include the camera sensor, the infrared sensor, and the ultrasonic sensor and may further include a temperature sensor, a humidity sensor, an illuminance sensor, and a noise sensor. The temperature sensor may measure the temperature at the inspection site. The humidity sensor may measure the humidity at the inspection site. The illuminance sensor may measure the illuminance at the inspection site. The noise sensor may measure the level of noise at the inspection site. The first sensor package 240 may further include, for example, a smell detection sensor, a carbonization detection sensor, a gas detection sensor, a pressure sensor, a wind speed sensor, and the like.

Figure 9:
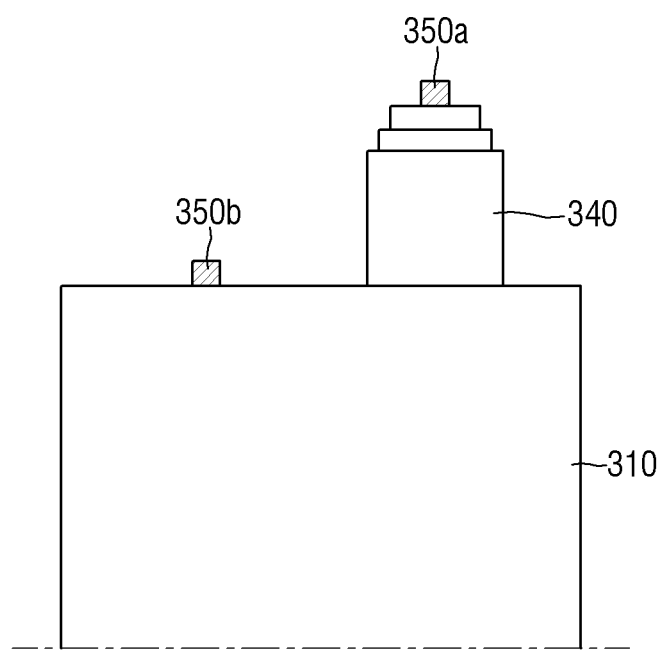
FIG. 9 is a schematic view illustrating the layout of the first sensor package 240 according to an embodiment of the present disclosure.

Referring to FIG. 9, some of the sensors included in the first sensor package 240, for example, a sensor 350a, may be mounted at the end of the telescopic lift 340, and some of the sensors included in the first sensor package 240, for example, a sensor 350b, may be mounted on the main body 310. The sensor 350b may be mounted on the top surface of the main body 310, but the present disclosure is not limited thereto. Alternatively, the sensor 350b may be mounted on a side surface of the main body 310.

The sensor 350a may be a sensor for which different inspection heights need to be set for a precise observation of the inspection target. Examples of the sensor 350a may include a camera sensor, an infrared sensor, and an ultrasonic sensor. The sensor 350b may be a sensor that performs inspection at a fixed height. Examples of the sensor 350b may include a temperature sensor, a humidity sensor, an illuminance sensor, and a noise sensor.

However, the present disclosure is not limited to this. All the sensors included in the first sensor package 240 may be mounted at the end of the telescopic lift 340 or on the main body 310, and/or duplicate sensors can be used to compare certain characteristics at a higher height to the same characteristics at a lower height. FIG. 9 is a schematic view illustrating the layout of the first sensor package 240.

The first sensor package 240 may be fabricated in a modular manner, for example, to include attachment ports to which different sensors can be removably connected. Accordingly, the sensors of the first sensor package 240 may be configured to be replaceable depending on the type of the inspection mission. The sensors of the first sensor package 240 may be replaced with other sensors suitable for the purpose of the inspection mission.

Referring again to FIGS. 4 and 5, the second sensor package 250 is for preventing the collision of the telescopic lift 340 with the ceiling of a high-altitude spot or an infrastructure facility (e.g., the inspection target such as equipment or pipes) at the high-altitude spot. For example, the second sensor package 250 may prevent the collision of the telescopic lift 340 or the first sensor package 240 with the infrastructure facility or may stop the telescopic lift 340 when the second sensor package 250 collides with the infrastructure facility (e.g., by sending a signal to the controller 270). The second sensor package 250 may include a plurality of sensors used for the inspection mission. The second sensor package 250, like the first sensor package 240, may be configured to have its sensors replaceable depending on the type of the inspection mission.

The second sensor package 250 may include a noncontact sensor and/or a contact sensor. The noncontact sensor may perform sensing to prevent the collision between the telescopic lift 340 or the first sensor package 240 and the ceiling of a high-altitude spot or an infrastructure facility at the high-altitude spot. The contact sensor may be used in preparation for cases where the sensing range of the noncontact sensor is limited or the noncontact sensor malfunctions or for other emergency situations.

The noncontact sensor may be installed at the end of the telescopic lift 340 together with the first sensor package 240, but the present disclosure is not limited thereto. Alternatively, the noncontact sensor may be installed on the main body 310 of the cover 220. When installed at the end of the telescopic lift 340, the noncontact sensor may be provided as a separate module from the first sensor package 240, but the present disclosure is not limited thereto. Alternatively, the noncontact sensor may be included in the first sensor package 240. In some embodiments, the noncontact sensor may be installed on the top surface of the the main body 310 of the cover 220 or on a side surface of the main body 310 of the cover 220.

Figure 10:
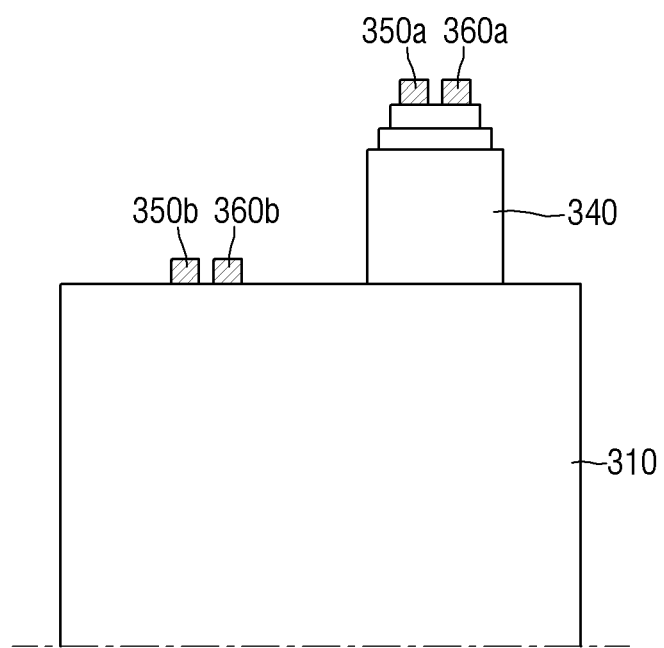
FIG. 10 is a schematic view illustrating the layout of the second sensor package 250 according to an embodiment of the present disclosure.

Examples of the noncontact sensor include a displacement sensor and a horizontal sensor. Referring to FIG. 10, a displacement sensor 360*a* may be installed at the end of the telescopic lift 340, and a horizontal sensor 360*b* may be installed on the top surface of the cover body 310. However, the present disclosure is not limited to this. Alternatively, the displacement sensor 360*a* and the horizontal sensor 360*b* may both be installed at the end of the telescopic lift 340 or on the top surface of the cover body 310.

In a case where the displacement sensor 360*a* is installed at the end of the telescopic lift 340, the displacement sensor 360*a* may be provided as a separate module from the sensor 350*a* of the first sensor package 240, but the present disclosure is not limited thereto. Alternatively, the displacement sensor 360*a* and the sensor 350*a* may be incorporated into the same module. Similarly, in a case where the horizontal sensor 360*b* is installed on the top surface of the main body 310, the horizontal sensor 360*b* may be provided as a separate module from the sensor 350*b* of the first sensor package 240, but the present disclosure is not limited thereto. Alternatively, the horizontal sensor 360*b* and the sensor 350*b* may be incorporated into the same module. FIG. 10 is a schematic view illustrating the layout of the second sensor package 250.

The displacement sensor 360*a* may detect an object at a certain distance in a noncontact manner. For example, the displacement sensor 360*a* may detect the height up to the ceiling of a high-altitude spot or the height of an infrastructure facility at the high-altitude spot. The displacement sensor 360*a* may perform the above-described functions when the telescopic lift 340 is yet to be lifted up.

The displacement sensor 360*a* may detect the maximum height to which an upper part of the telescopic lift 340 can be lifted when the telescopic lift 340 is yet to be lifted up, and may thus limit the maximum height of the telescopic lift 340. If an object is detected from above the telescopic lift 340 when the telescopic lift 340 is being lifted up, the displacement sensor 360*a* can send a signal, for example to controller 270, that causes the telescopic lift 340 to stop (e.g., in response to a sensor signal from displacement sensor 260*a*, the controller 270 may cause the telescopic lift 340 to stop from raising higher).

The displacement sensor 360*a* may include a first sensor detecting an obstacle at a first distance and a second sensor detecting an obstacle at a second distance. The second distance may be less than the first distance. The first sensor may include an optical sensor. For example, the first sensor may include a laser sensor. The second sensor may include an ultrasonic sensor. The second sensor may perform the functions of the first sensor when the first sensor does not operate normally.

The horizontal sensor 360*b* is a sensor for preventing any danger (e.g., an overturn or collision of the mobile robot 110) that may occur when the telescopic lift 340 is lifted up with the mobile robot 110 tilted. The telescopic lift 340 may be lifted up in the vertical direction D3 with respect to the floor. However, if a slope is generated with respect to the floor when the telescopic lift 340 is being lifted up, measurements from the displacement sensor 360*a* may become imprecise, and the telescopic lift 340 may collide with the ceiling of a high-altitude spot or an infrastructure facility at the high-altitude spot. The horizontal sensor 360*b* may be used to prevent such collision.

The horizontal sensor 360*b* may measure the posture of the mobile robot 110. The horizontal sensor 360*b* may measure the slope of the telescopic lift 340. The horizontal sensor 360*b* may perform these measurement functions when the telescopic lift 340 is being lifted up. If the posture of the mobile robot 110 is not horizontal to the floor, the horizontal sensor 360*b* may prevent the telescopic lift 340 from being lifted up (e.g., by sending a signal to the controller 270, which controls the lifting of the telescopic lift 340).

When the telescopic lift 340 is being lifted up, the horizontal sensor 360*b* may measure the slope of the telescopic lift 340 at intervals of a predetermined amount of time. For example, as soon as the telescopic lift 340 begins to be lifted up, the horizontal sensor 360*b* may measure the slope of the telescopic lift 340 in real time until the lifting up of the telescopic lift 340 is complete, but the present disclosure is not limited thereto. Alternatively, the horizontal sensor 360*b* may measure the slope of the telescopic lift 340 whenever the telescopic lift 340 is lifted up by as much as a predetermined height. For example, the horizontal sensor 360*b* may measure the slope of the telescopic lift 340 whenever the telescopic lift 340 is lifted up by as much as 0.3 m.

The contact sensor is a secondary safety sensor for cases where the noncontact sensor is unable to detect any object above the telescopic lift 340. When the telescopic lift 340 is being lifted up, the contact sensor, which may be placed in physical contact with the end of the telescopic lift 340, may receive an external force, indicating for example that the contact sensor has contacted another object. Then, the contact sensor may stop the telescopic lift 340 (e.g., by sending a signal to the controller 270, which controls the lifting of the telescopic lift 340). The contact sensor may be provided as an additional safety device for minimizing any damage to CSF pipes in a certain environment where the displacement sensor 360 is unable to perform detection. Examples of the contact sensor include a touch sensor, a bumper sensor, and a load cell.

The telescopic lift 340 may be used to inspect pipes or equipment in the fab. Thus, anticollision sensing is important to be performed to prevent the telescopic lift 340 from colliding with pipes or equipment at a high-altitude spot.

Distance sensing may be performed via a time-of-flight (TOF) camera or the noncontact sensor, such as an ultrasonic sensor, and the contact sensor, such as a bumper sensor, may be provided to prevent the telescopic lift 340 from being lifted up any further to destroy pipes or equipment.

Also, the horizontal sensor 360*b* may be provided in consideration of any danger (e.g., an overturn of the mobile robot 110) that may occur when the telescopic lift 340 is lifted up with the mobile robot 110 tilted. Accordingly, in some embodiments, the mobile robot 110 may be controlled so that the telescopic lift 340 can be driven only when the mobile robot 110 is level.

Figure 11:
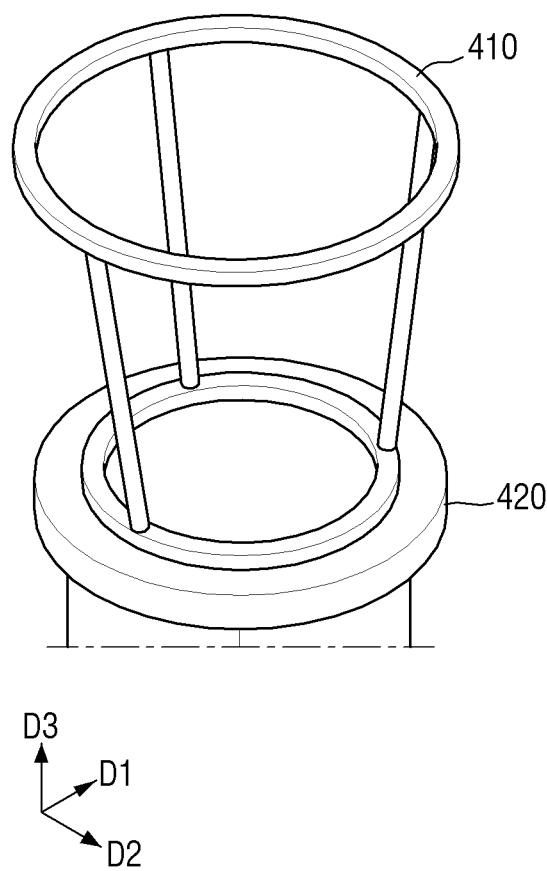
FIG. 11 is a perspective view of a contact sensor assembly 360C of the second sensor package 250 according to an embodiment of the present disclosure.
Figure 12:
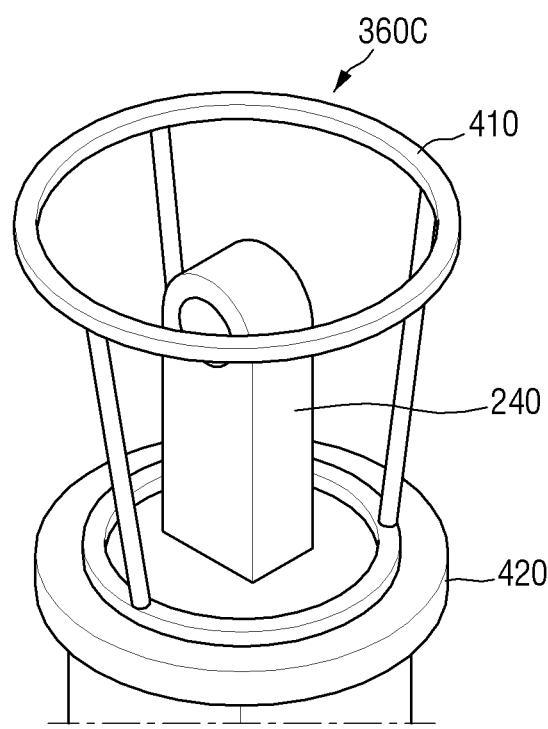
FIG. 12 is a perspective view of the layout of the first sensor package 240 and the contact sensor assembly 360C according to an embodiment of the present disclosure.

FIG. 11 is a perspective view of a contact sensor assembly 360C of the second sensor package 250. FIG. 12 is a perspective view of the layout of the first sensor package 240 and the contact sensor assembly 360C.

Referring to FIGS. 11 and 12, the contact sensor assembly 360C may include a bumper sensor frame 410 and a frame driving unit 420. The bumper sensor frame 410 may be designed not to interfere with the operation of the first sensor package 240. For example, referring to FIG. 13, in a case where the first sensor package 240 includes a rotational camera 350c, the bumper sensor frame 410 may rotate clockwise or counterclockwise on the frame driving unit 420. If the bumper sensor frame 410 is configured to be rotatable on the frame driving unit 420, a field-of-view (FOV) interference region can be prevented from being generated in an image captured by the rotational camera 350c due to the presence of the bumper sensor frame 410. FIG. 13 is a perspective view illustrating the operating principle of the bumper sensor frame 410 of the contact sensor assembly 360C.

Referring to FIG. 14, the bumper sensor frame 410 may include a first ring member 411 (also described as a first ring), a second ring member 412 (also described as a second ring), and a plurality of pillar members (also described as a plurality of pillars). The first ring member 411, second ring member 412, and plurality of pillar members may be integrally formed, and may be made of a rigid or flexible material, such as rubber or a plastic. FIG. 14 is a perspective view illustrating the structure of the bumper sensor frame 410 of the contact sensor assembly 360C.

Figure 15:
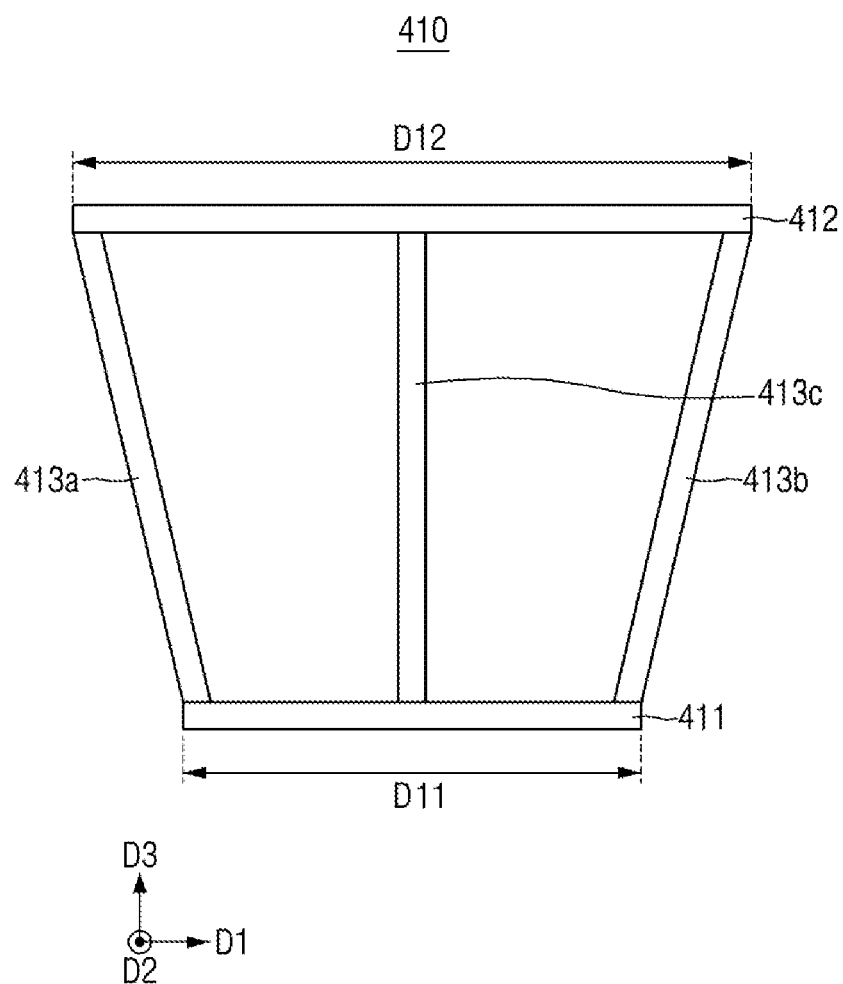
FIG. 15 is a schematic view for comparing the first and second ring members 411 and 412 of the bumper sensor frame 410 according to an embodiment of the present disclosure.

The first and second ring members 411 and 412 may be formed in a ring shape (e.g., a closed loop, which in some embodiments has a circular shape). The second ring member 412 may be disposed above the first ring member 411. Referring to FIG. 15, a diameter $D_{12}$ of the second ring member 412 may be greater than a diameter $D_{11}$ of the first ring member 411 (i.e., $D_{12}>D_{11}$), but the present disclosure is not limited thereto. Alternatively, the diameter $D_{12}$ of the second ring member 412 may be the same as the diameter $D_{11}$ of the first ring member 411 (i.e., $D_{12}=D_{11}$) or may be less than the diameter $D_{11}$ of the first ring member 411 (i.e., $D_{12}<D_{11}$). FIG. 15 is a schematic view for comparing the first and second ring members 411 and 412 of the bumper sensor frame 410.

The pillar members connect the first and second ring members 411 and 412. A plurality of pillar members may be provided. For example, the pillar members may include three pillar members, i.e., first, second, and third pillar members 413a, 413b, and 413c.

The first sensor package 240 may be disposed in the bumper sensor frame 410. The height of the first sensor package 240 may be less than the height of the bumper sensor frame 410 such that the first sensor package 240 may be protected by the bumper sensor frame 410 from the risk of a collision. Referring to FIG. 16, a height b of the bumper sensor frame 410 may be greater than a height a of the first sensor package 240 (i.e., b>a). FIG. 16 is a schematic view for comparing the first sensor package 240 and the contact sensor assembly 360C of the second sensor package 250.

The frame driving unit 420 may support the bumper sensor frame 410 and may sense an impact applied to the bumper sensor frame 410. Here, the impact refers to an impact generated when the bumper sensor frame 410 collides with the ceiling of a high-altitude spot or equipment or pipes installed at the high-altitude spot. The frame driving unit 420 may also rotate the bumper sensor frame 410.

Figure 17:
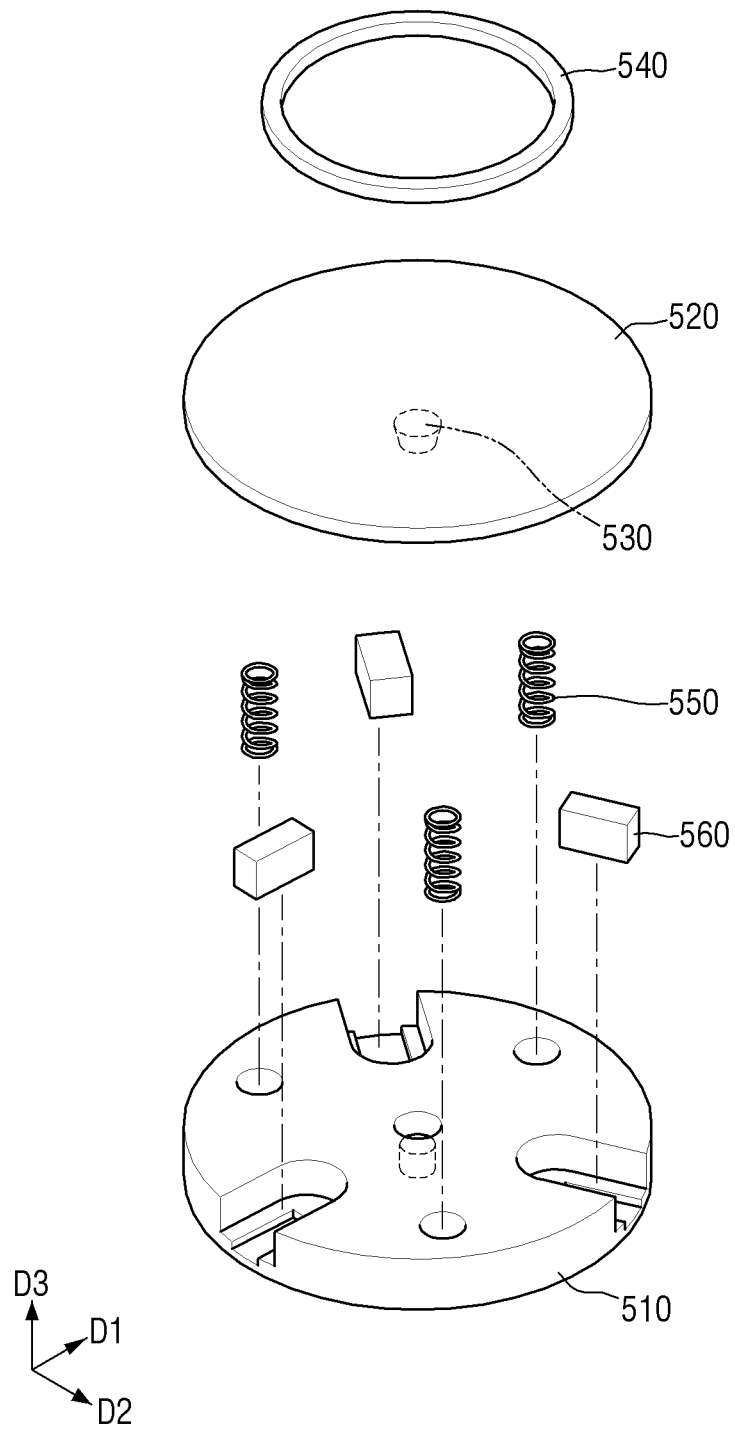
FIG. 17 is an exploded perspective view illustrating the inner structure of the frame driving unit 420 of the contact sensor assembly 360C according to an embodiment of the present disclosure.
Figure 18:
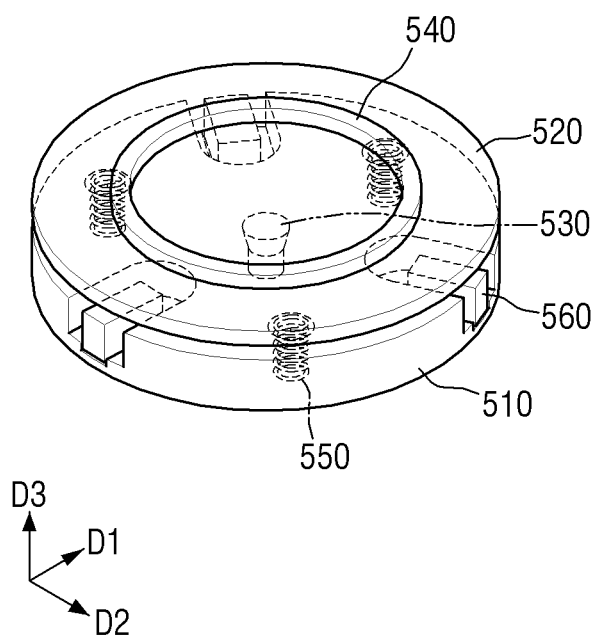
FIG. 18 is a combined perspective view illustrating the inner structure of the frame driving unit 420 of the contact sensor assembly 360C according to an embodiment of the present disclosure.

Referring to FIGS. 17 and 18, the frame driving unit 420 may include a first plate member 510 (e.g., first plate), a second plate member 520 (e.g., second plate), a disengagement prevention guide 530, a rotating member 540 (also described as a rotating ring), spring members 550 (e.g., springs), and mechanical switches 560. FIG. 17 is an exploded perspective view illustrating the inner structure of the frame driving unit 420 of the contact sensor assembly 360C. FIG. 18 is a combined perspective view illustrating the inner structure of the frame driving unit 420 of the contact sensor assembly 360C.

The first and second plate members 510 and 520 may be disposed (e.g., stacked) in the vertical direction D3. The first and second plate members 510 and 520 may be formed to have the same shape. The first and second plate members 510 and 520 may be formed in a disk shape (e.g., a circular shape), but the present disclosure is not limited thereto. Alternatively, the first and second plate members 510 and 520 may be formed as polygonal or elliptical plates. In some embodiments, the first and second plate members 510 and 520 may be formed in different shapes.

The disengagement prevention guide 530 may support the second plate member 520, on the first plate member 510. The disengagement prevention guide 530 may be coupled to the first and second plate members 510 and 520 such that the second plate member 520 may be able to be tilted in various directions on the first plate member 510. The disengagement prevention guide 530 may be coupled to the first and second plate members 510 and 520 and may thus prevent disengagement of the first and second plate members 510 and 520. The disengagement prevention guide 530 may be disposed between the first and second plate members 510 and 520, in a center area. The disengagement prevention guide 530 may be, for example, a protrusion or peg that has a corresponding hole in the first plate member 510 into which the disengagement prevention guide 530 may be inserted.

The rotating member 540 is for rotating the bumper sensor frame 410. The rotating member 540 may rotate clockwise or counterclockwise. The rotating member 540 may be or include a thrust bearing, but the present disclosure is not limited thereto. Alternatively, the rotating member 540 may include or be connected to a motor. The rotating member 540 may be connected to the first ring member 411 to rotate the bumper sensor frame 410. The rotating member 540 may be disposed between the first and second plate members 510 and 520, but the present disclosure is not limited thereto. Alternatively, the rotating member 540 may be disposed on or buried in the top surface of the second plate member 520.

In a case where the rotating member 540 is disposed between the first and second plate members 510 and 520, the rotating member 540 may be positioned in a middle area (e.g., to have a radius from a plan view between ⅓ and ⅔ the radius of the first and/or second plate members 510 and 520). The rotating member 540 may be disposed to surround the disengagement prevention guide 530. The rotating member 540 may rotate the bumper sensor frame 410 by rotating the second plate member 520.

The spring members 550 may be provided to rotate the second plate member 520 back to its original location on the first plate member 510. Thus, even if the second plate member 520 is tilted by a predetermined angle on the first plate member 510, the second plate member 520 may be moved back to its original location by the spring members 550.

The spring members 550 may be disposed between the first and second plate members 510 and 520. The spring members 550 may be disposed on the outside of the disengagement prevention guide 530 and the rotating member 540. The spring members 550 may be disposed in an edge area between the rotating member 540 and an outer circumference of the first and/or second plate members 510 and 520. The spring members 550 may be secured into respective recesses in a top surface of the first plate member 510. When no load is applied to the spring members 550 other than the weight from the second plate member 520, the spring members 550 may be in a position that causes the second plate member 520 to be separated from the mechanical switches 560. A plurality of spring members 550 may be provided and may be arranged at intervals of a predetermined distance, but the present disclosure is not limited thereto.

The mechanical switches 560 may generate signals when in contact with the second plate member 520. If the bumper sensor frame 410 collides with the ceiling of a high-altitude spot or equipment or pipes at the high-altitude spot, the second plate member 520 may be tilted by the resulting impact. In this case, the second plate member 520 may contact and press the mechanical switches 560, and the mechanical switches 560 may generate signals and provide the signals to the controller 270. The controller 270 may detect the collision of the bumper sensor frame 410 based on the signals provided by the mechanical switches 560. The term "contact," "contacting," "contacts," or "in contact with," as used herein, refers to a direct connection (i.e., touching) unless the context clearly indicates otherwise.

The mechanical switches 560, like the spring members 550, may be disposed between the first and second plate members 510 and 520, in the edge area. For example, the mechanical switches 560 may be located at the edges of the first and second plate members 510 and 520. The mechanical switches 560 and the spring members 550 may be alternately arranged. As many mechanical switches 560 as there are spring members 550 may be provided, but the present disclosure is not limited thereto. Alternatively, the number of mechanical switches 560 may differ from the number of spring members 550.

Referring again to FIGS. 4 and 5, the pan-tilt unit 260 is for controlling the sensing area/direction of a sensor. Here, the sensor may be a sensor of the first sensor package 240, but the present disclosure is not limited thereto. Alternatively, the sensor may be a sensor of the second sensor package 250. The pan-tilt unit 260 may be provided as a lift end effector pan-tilt unit connecting the telescopic lift 340, the first sensor package 240, and the second sensor package 250.

The pan-tilt unit 260 may move the sensor in a first horizontal direction D1, but the present disclosure is not limited thereto. Alternatively, the pan-tilt unit 260 may move the sensor in a second horizontal direction D2. Alternatively, the pan-tilt unit 260 may move the sensor in the vertical direction D3.

Figure 19:
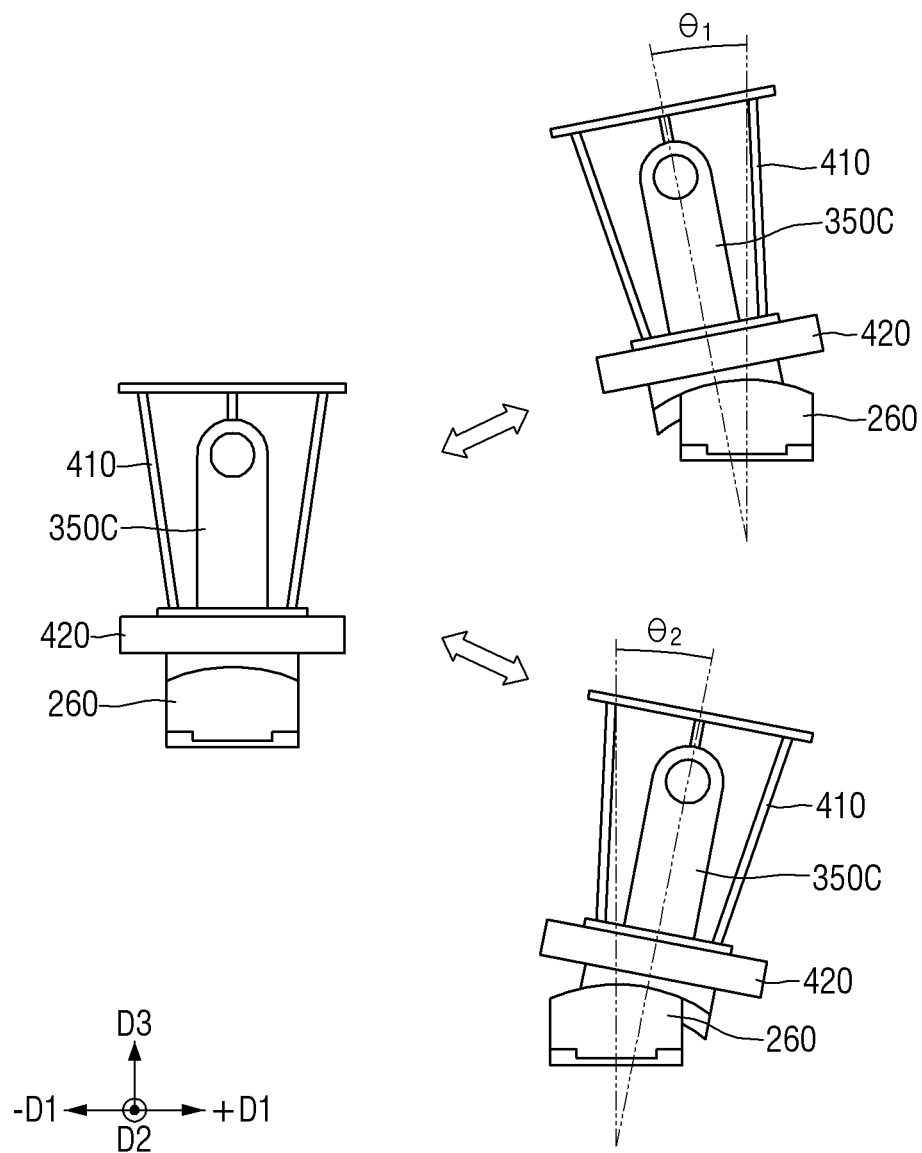
FIG. 19 is a first exemplary schematic view illustrating the operating principle of the pan-tilt unit 260 of the mobile robot 110 according to an embodiment of the present disclosure.

Referring to FIG. 19, the pan-tilt unit 260 may move the rotational camera 350c in a leftward direction +D1 or a rightward direction −D1. FIG. 19 is a first exemplary schematic view illustrating the operating principle of the pan-tilt unit 260 of the mobile robot 110.

Figure 20:
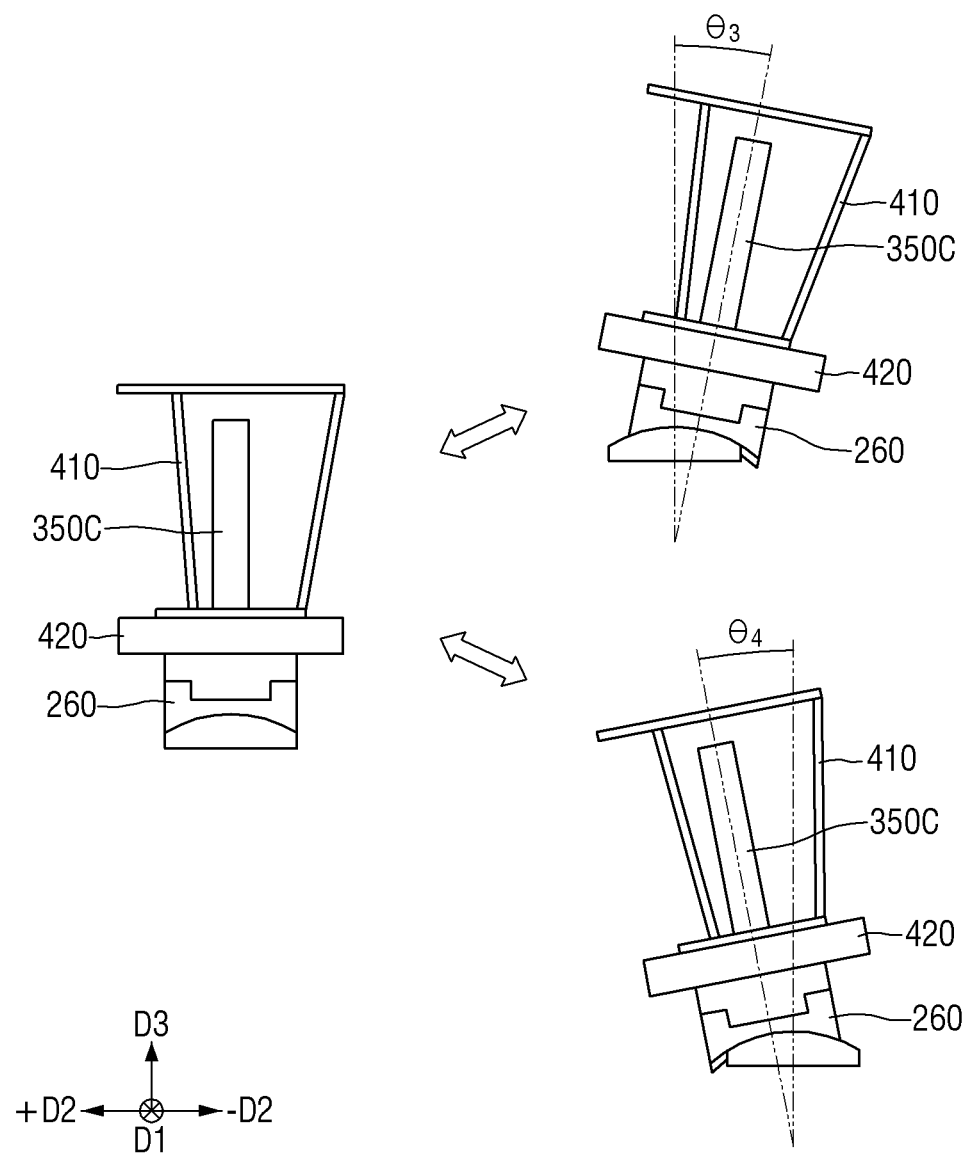
FIG. 20 is a second exemplary schematic view illustrating the operating principle of the pan-tilt unit 260 of the mobile robot 110 according to an embodiment of the present disclosure.

Alternatively or additionally, referring to FIG. 20, the pan-tilt unit 260 may move the rotational camera 350c in a forward direction +D2 or a backward direction −D2. FIG. 20 is a second exemplary schematic view illustrating the operating principle of the pan-tilt unit 260 of the mobile robot 110.

Figure 21:
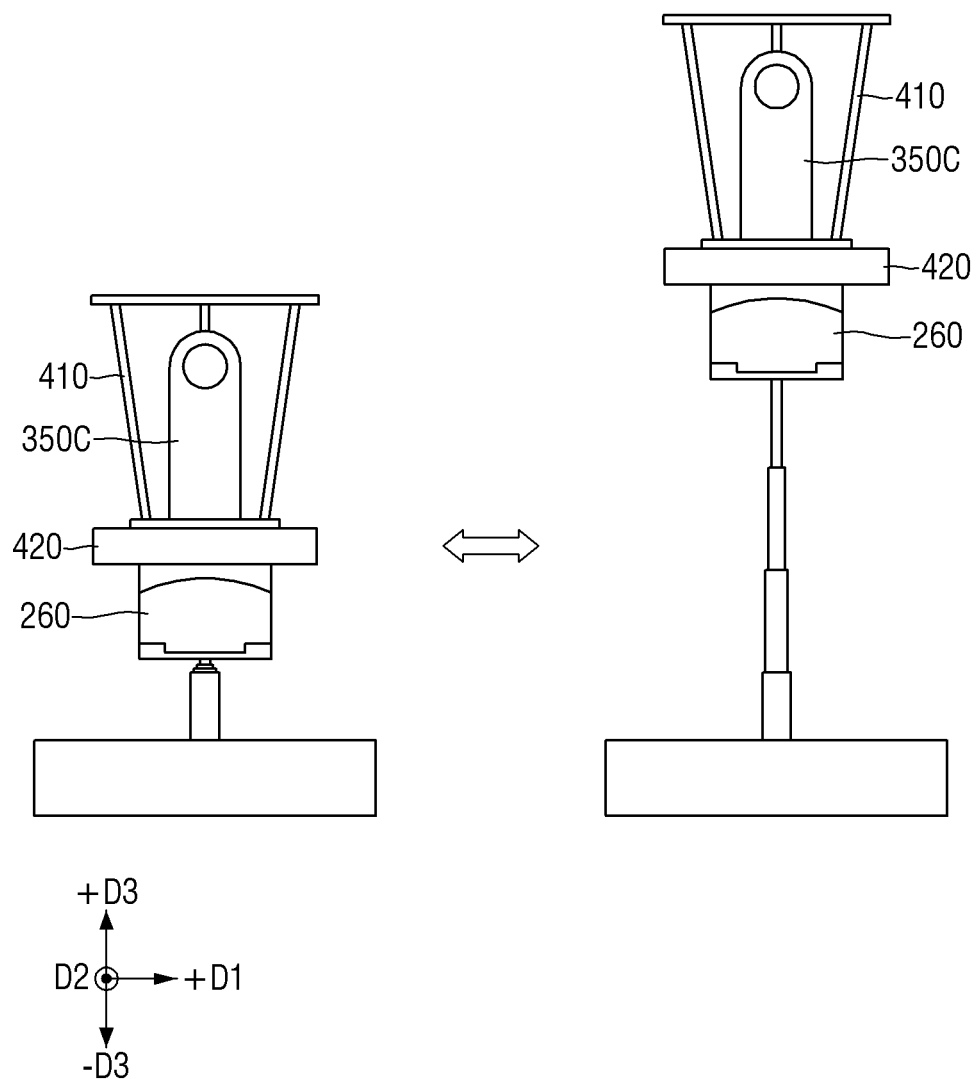
FIG. 21 is a third exemplary schematic view illustrating the operating principle of the pan-tilt unit 260 of the mobile robot 110 according to an embodiment of the present disclosure.

Alternatively or additionally, referring to FIG. 21, the pan-tilt unit 260 may move the rotational camera 350c in the upward direction +D3 or the downward direction −D3. FIG. 21 is a third exemplary schematic view illustrating the operating principle of the pan-tilt unit 260 of the mobile robot 110.

In a case where the sensor is a direction sensor, the pan-tilt unit 260 may be used to change the FOV of the sensor. The pan-tilt unit 260 may include an additional lift to navigate between pipes. The pan-tilt unit 260 may move the sensor in the vertical direction D3 using the additional lift. The pan-tilt unit 260 may move the sensor in the horizontal direction, the back-and-forth direction (e.g., rotational direction), and the vertical direction D3 and may thus provide an additional degree of freedom for the sensor. Accordingly, images of even the inside of narrow pipes can be captured.

Referring again to FIGS. 4 and 5, the controller 270 controls the mobile robot 110 based on mission information requested by the first server 120. For example, the controller 270 may control the operation of the telescopic controller 340 and/or the pan-tilt unit 260. Also, the controller 270 may stop the operation of the driving unit 210 or the telescopic lift 340 based on sensing data received from the second sensor package 250. Also, the controller 270 may transmit information obtained from the first sensor package 240 to the first server 120.

The controller 270 may include a robot-mounted anomaly detection processor. The robot-mounted anomaly detection processor may automatically detect what is considered an emergency (e.g., a person who is down on the floor, a fire, a leak on the floor, etc.) based on sensing data obtained by the first sensor package 240 and may readily transmit the result of the detection to the first server 120 using a robot-side communication unit. The robot-mounted anomaly detection processor may include hardware and software (e.g., computer readable program code) configured to perform the automatic detection (e.g., using video processing and event detection, and other detection programs).

As already mentioned above, an FOV interference region may be generated in an image captured by the rotational camera 350c due to the presence of the bumper sensor frame 410. The controller 270 may remove the FOV interference region from the image captured by the rotational camera 350c. The controller 270 may remove the FOV interference region using an image processing algorithm.

Figure 22:
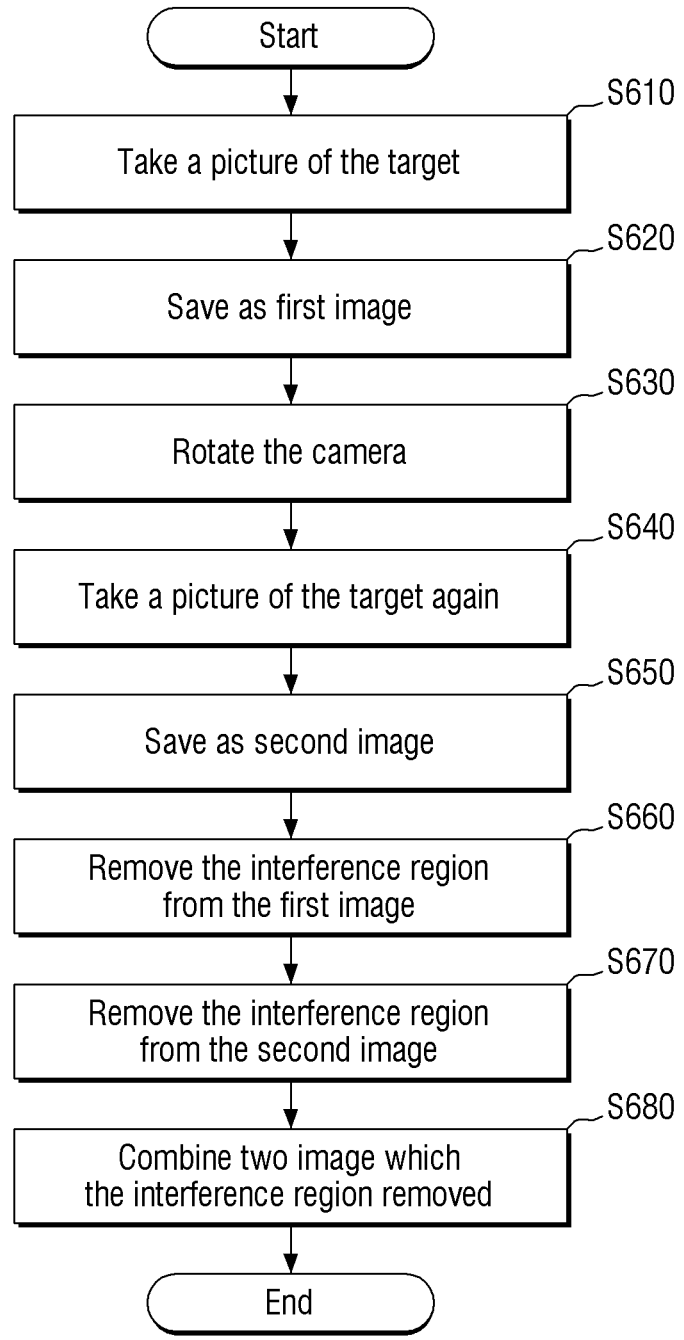
FIG. 22 is a flowchart illustrating how the controller 270 of the mobile robot 110 can remove an FOV interference region according to an embodiment of the present disclosure.

FIG. 22 is a flowchart illustrating how the controller 270 of the mobile robot 110 can remove an FOV interference region.

Referring to FIG. 22, if the bumper sensor frame 410 includes three pillar members, i.e., the first, second, and third pillar members 413a, 413b, and 413c, and an FOV interference region is generated in an image captured by the rotational camera 350c due to the presence of the first, second, and third pillar members 413a, 413b, and 413c, the controller 270 may remove the FOV interference region.

Specifically, the rotational camera 350c captures at least one image of an inspection target at a particular location under the control of the controller 270 (S610) and stores the captured image as a first image (S620). The rotational camera 350c may capture only one image of the inspection target or multiple images of the inspection target. The controller 270 may store images captured by the rotational camera 350c and may select one of the stored images with a highest resolution during image processing.

Thereafter, the rotational camera 350c is rotated by a predetermined angle under the control of the controller 270 (S630), captures at least one image of the inspection target again (S640), and stored the captured image as a second image (S650). The rotational camera 350c may be rotated by the rotating member 540 of the frame driving unit 420. The predetermined angle may be greater than 0° and less than 360°, and may be an amount that causes the interference region to be free from an interfering pillar.

Thereafter, the controller 270 removes an FOV area from the first image. For example, the controller 270 may extract a third image including the entire first image excluding the FOV area (S660). Similarly, the controller 270 may remove the FOV area from the second image. For example, the controller 270 may extract a fourth image including the entire second image excluding the FOV area (S670).

Thereafter, the controller 270 generates an FOV-removed image by combining the third and fourth images (S680). Due to the rotation of the rotational camera 350c, the FOV area is not at the same location in the first image as it is in the second image. Thus, the FOV-removed image may be generated by combining the third and fourth images in consideration of multiple feature points. In this manner, an interfering pillar or set of interfering pillars, or more generally, an interfering object or set of interfering objects, may be removed from an image of a target. This interference removal is particularly useful here where an object such as a bumper sensor frame 410 is used to detect contact or impending contact of a sensor package of a robot with one or more external objects, and the bumper sensor frame 410 adds an interference region in the image of the target.

The controller 270 may acquire an image from which a blind area covered by the bumper sensor frame 410 is removed, using an image processing algorithm, and may use the acquired image as a final sensing result.

The first server 120 may be provided as a server system performing anomaly detection based on sensing data obtained by the mobile robot 110 and displaying the result of the anomaly detection.

Figure 23:
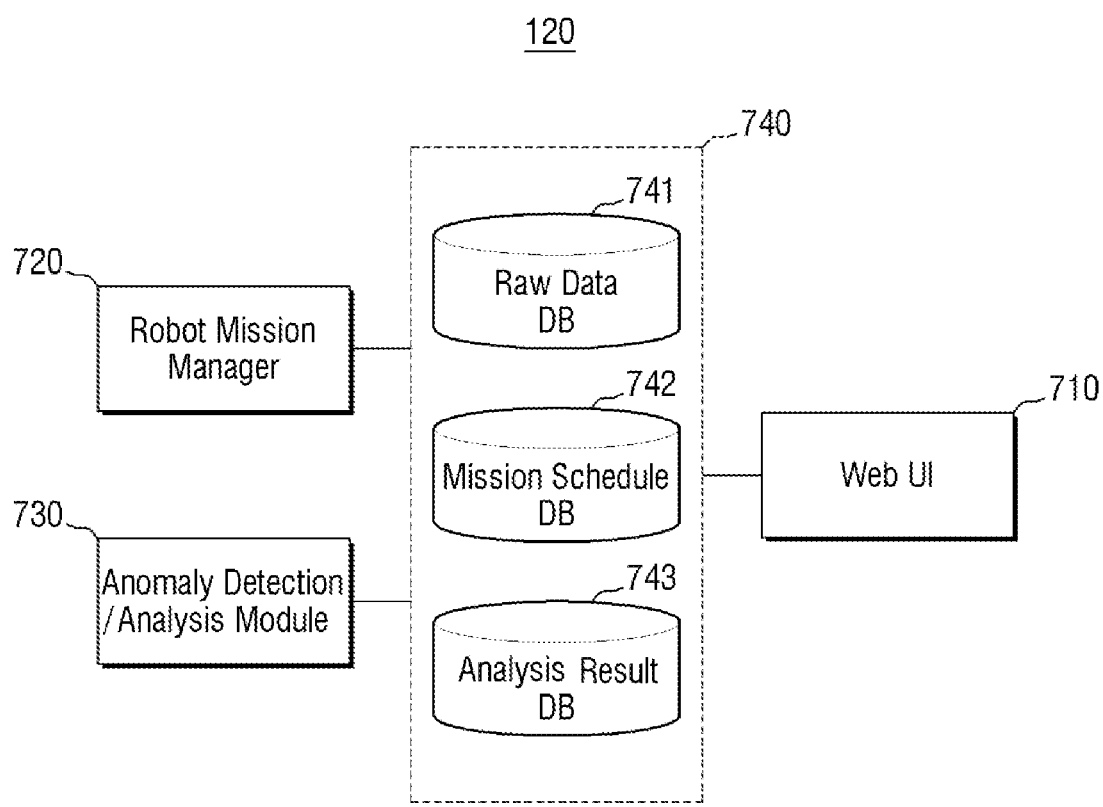
FIG. 23 is a block diagram of the first server 120 of the unmanned inspection system 100 according to an embodiment of the present disclosure.

FIG. 23 is a block diagram of the first server 120 of the unmanned inspection system 100.

Referring to FIG. 23, the first server 120 may include a Web user interface (UI) 710, a robot mission manager 720, an anomaly detection/analysis module 730, and a database (DB) 740. The DB 740 may include a raw data DB 741, a mission schedule DB 742, and an analysis result DB 743.

The web UI 710, which is a Web-based UI, is for interfacing with a remote worker. The Web UI 710 may allow the worker to make an inquiry about diagnostic inspection patrol result data and real-time sensing data from the mobile robot 110. The Web UI 710 may remotely control the mobile robot 110 and may adjust the patrol schedule of the mobile robot 110. The worker may access the Web UI 110 via the worker terminal 130.

The Web UI 710 may perform the functions of a Web server. The Web UI 710 may provide the worker terminal 130 with primary sensing result data obtained as a result of a diagnostic inspection patrol performed by the mobile robot 110 and post-processing result data from the anomaly detection/analysis module 730. Also, the Web UI 710 may provide the worker terminal 130 with diagnostic inspection sensing obtained in real time by the mobile robot 110 at an inspection site and status information of the mobile robot 110 (e.g., current location or battery level).

The robot mission manager 720 manages unmanned missions of the mobile robot 110. The robot mission manager 720 may remotely control the mobile robot 110 in accordance with a predefined schedule. The robot mission manager 720 may include a patrol scheduler module (not illustrated).

The mobile robot 110 may patrol the inspection site under the control of the patrol scheduler module. The patrol scheduler module may assign a diagnostic inspection patrol mission to at least one mobile robot 110 in accordance with a patrol schedule stored in the DB 740 and may make the mobile robot 110 conduct a patrol in the inspection site.

The patrol scheduler module may process the result of the patrol conducted by the mobile robot 110. The patrol scheduler module may perform an upload function for storing diagnostic inspection sensing data provided by the mobile robot 110 during or after the patrol in the DB 740.

The anomaly detection/analysis module 730 may perform secondary processing for anomaly detection based on raw data obtained by the mobile robot 110. The anomaly detection/analysis module 730 may use a deep learning/machine learning technique. The anomaly detection/analysis module 730 may perform processing for detecting any potential risks in the fab based on the diagnostic inspection sensing data obtained by the mobile robot 110 through a patrol mission. The anomaly detection/analysis module 730 may store the result of the processing, i.e., post-processing result data, in the DB 740. Here, the potential risks may include the leakage of liquids or gases used in semiconductor manufacturing processes, the corrosion, contamination, or cracking of equipment or pipes, and various odors or carbonization around the pipes.

The DB 740 collects and stores various types of information. The DB 740 may store sensing data from the mobile robot 110, post-processing result data, and patrol schedule information. Here, the sensing data may be diagnostic inspection sensing data including patrol sensing result data from the mobile robot 110, the post-processing result data may be anomaly detection result data including post-processing result data from the anomaly detection/analysis module 730, and the patrol schedule information may include patrol location information and patrol time information for each mobile robot 110.

Although not specifically illustrated in FIG. 23, the first server 120 may include a server-side communication unit. The server-side communication unit may allow the mobile robot 110, which is connected to the wired/wireless network 140, to exchange information with another system, which may be a communication system and/or an integrated disaster prevention alarm system. The integrated disaster prevention alarm system transmits location information of an emergency together with a notification. The communication system and the integrated disaster prevention alarm system will be described later.

The operating scenario of the first server 120 for unmanned inspection is as follows.

A remote worker creates and modifies robot inspection mission information via the Web UI 710. The robot inspection mission information is stored in the mission schedule DB 742. The remote worker may access the first server 120 via the worker terminal 130. The robot inspection mission information may include inspection target information, inspection schedule information, and inspection route information.

The robot mission manager 720 transmits a request message to the mobile robot 110 via the wired/wireless network 140 such that the mobile robot 110 can perform unmanned inspection in accordance with the robot inspection mission information. Here, map information regarding the inspection site, the inspection coordinates of the inspection site, and an inspection target may be set in advance.

The mobile robot 110 performs unmanned inspection, autonomously driving along a designated path in accordance with a requested mission. The mobile robot 110 transmits inspection sensing data (i.e., raw data) to the first server 120 via a wireless communication network at the inspection site. The first server 120 stores the inspection sensing data in the raw data DB 741.

The anomaly detection/analysis module 730 determines potential risk factors by performing an anomaly detection algorithm for a given inspection purpose based on the data accumulated in the raw data DB 741, and stores the result of the determination in the analysis result DB 743.

When the aforementioned processes are all complete, the remote worker makes an inquiry about raw data from the mobile robot 110 and secondary processing data from the anomaly detection/analysis module 730 via the Web UI 710.

The unmanned inspection system 100, described above with reference to FIGS. 1 through 23, is an exemplary system for use in diagnostic inspection. The unmanned inspection system 100 embodies an overall methodology for automating diagnostic inspection in a fab using the mobile robot 110. Also, the unmanned inspection system 100 embodies a methodology for configuring an anomaly detection module, which performs a function desired by the operators of a fab, a patrol scheduler, which is required for the automatic patrol of the mobile robot 110, and a DB. Examples of the function desired by the operators of a fab include a function of detecting any potential risks such as the leakage of liquids or gases used in semiconductor manufacturing processes, the corrosion, contamination, or cracking of pipes, and various odors or carbonization around pipes.

Figure 24:
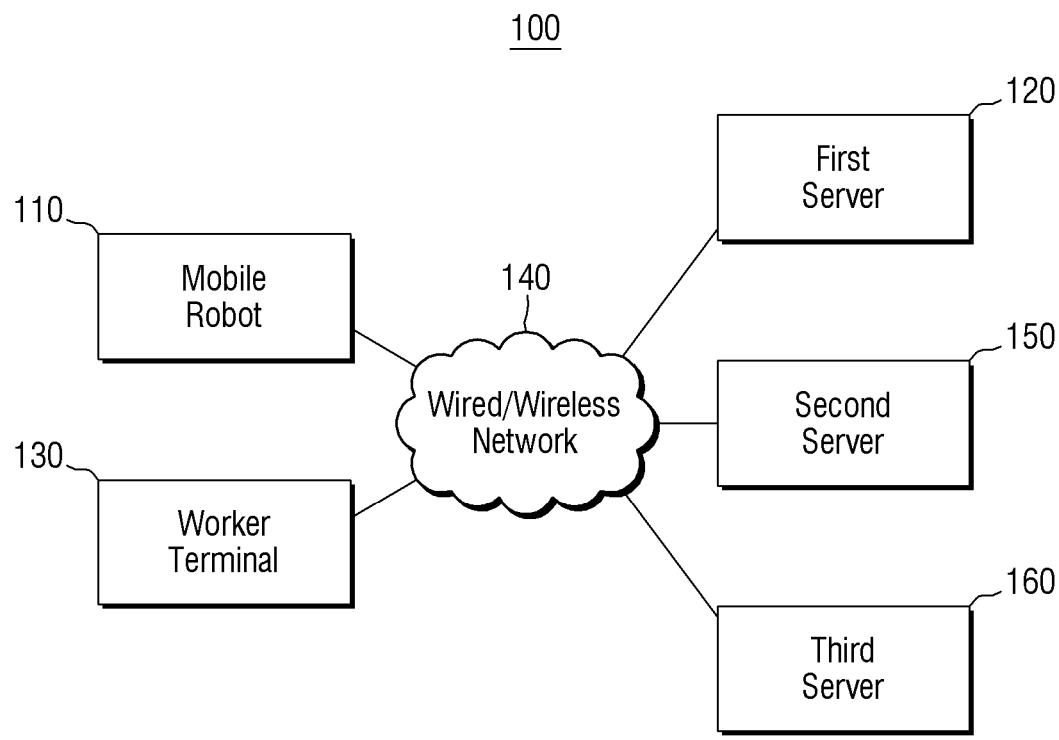
FIG. 24 is a block diagram of an unmanned inspection system according to an embodiment of the present disclosure.
Figure 25:
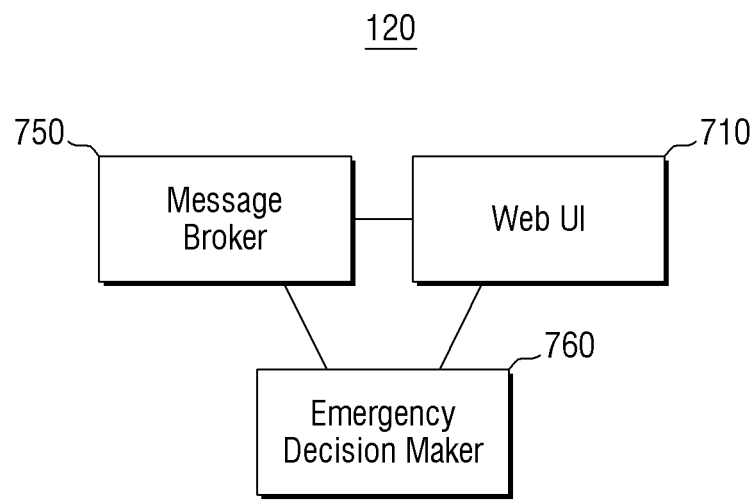
FIG. 25 is a block diagram of a first server of the unmanned inspection system of FIG. 24 according to an embodiment of the present disclosure.

FIG. 24 is a block diagram of an unmanned inspection system according to an embodiment of the present disclosure. FIG. 25 is a block diagram of a first server of the unmanned inspection system of FIG. 24.

Referring to FIG. 24, an unmanned inspection system 100 may include a mobile robot 110, a first server 120, a worker terminal 130, a second server 150, and a third server 160. Referring to FIG. 25, the first server 120 may include a Web UI 710, a message broker 750, and an emergency decision maker 760.

The embodiment of FIGS. 24 and 25 will hereinafter be described, focusing mainly on the differences with the embodiment of FIGS. 1 and 23.

The unmanned inspection system 100 is an exemplary system for use in an emergency response. The unmanned inspection system 100 embodies an overall methodology for automating an emergency response in a fab using the mobile robot 110. The unmanned inspection system 100 embodies a system configuration methodology for a function desired to be robot-automated for an emergency situation. Examples of the function desired to be robot-automated for an emergency situation include an emergency dispatch/on-site sensing function, a workers' access control function (e.g., banning worker access to certain areas, for example, by playing an audio recording or conveying another message indicating that access is banned), a leakage point identification function, and a function of determining whether to cancel an emergency situation.

If a notification of an accident and location information of the accident are obtained from the third server 160 via a server-side communication unit (not illustrated) of the first server 120, the unmanned inspection system 100 may consider it as an emergency and may perform an emergency response function. It should be noted that though three servers are depicted in FIG. 24, a single server machine may be used that includes all of the functionality of the three servers shown in FIG. 24.

When the unmanned inspection system 100 performs the emergency response function, the mobile robot 110 may move to the scene of the accident and transmit, in real time, sensing data that it acquires while moving to the scene of the accident or after arriving at the scene of the accident and detection result data (e.g., whether there are any patients or whether there is a fire) provided by a robot-mounted anomaly detection processor (not illustrated) to the first server 120.

While autonomously driving throughout the scene of the accident, the mobile robot 110 may send instructions to evacuate the scene of the accident or prevent workers from approaching the scene of the accident. Also, while autonomously driving throughout the scene of the accident, the mobile robot 110 may acquire on-site information using the robot-mounted anomaly detection processor. The mobile robot 110 may determine whether workers can enter the scene of the accident based on the acquired on-site information and may transmit the result of the determination to the first server 120. Various algorithms, computer learning, artificial intelligence, and other types of computer program code can be used to implement these functions.

When the unmanned inspection system 100 performs an emergency response function for a gas/liquid leak, the mobile robot 110 may acquire on-site information using a first sensor package 240 and the robot-mounted anomaly detection processor, while autonomously driving throughout the scene of the accident. The mobile robot 110 may identify the location of the gas/liquid leak at the scene of the accident based on the acquired on-site information and may transmit the result of the identification to the first server 120.

The first server 120 may transmit information provided by the mobile robot 110 to an integrated disaster prevention/management room. The first server 120 may send an alarm and current situation information to emergency responders via the second server 150.

The emergency decision maker 760, which may be implemented via computer program code stored on a computer-readable storage medium in combination with computer hardware, may determine whether an emergency situation has occurred in each zone of a fab. The emergency decision maker 760 may detect the occurrence of an emergency situation based on sensing data provided by the mobile robot 110. The emergency decision maker 760 may determine whether there are potential risks in each zone of the fab and may determine that an emergency situation has occurred in a zone of the fab that has the potential risks. The emergency decision maker 760 may share the result of its determination with the Web UI 710, the second server 150, and the third server 160. The worker terminal 130 may obtain the result of the determination performed by the emergency decision maker 760 via the Web UI 710.

The unmanned inspection system 100 may further include the anomaly detection/analysis module 730 of FIG. 23. The anomaly detection/analysis module 730 may determine whether there are the potential risks in each zone of the fab, and the emergency decision maker 760 may determine whether an emergency situation has occurred in each zone of the fab based on the result of the determination performed by the anomaly detection/analysis module 730. However, the present disclosure is not limited to this. Alternatively, the anomaly detection/analysis module 730 may determine both whether there are the potential risks in each zone in the fab and whether an emergency situation has occurred in each zone of the fab.

The first server 120 may include only one of the anomaly detection/analysis module and the emergency decision maker 760, but the present disclosure is not limited thereto. Alternatively, the first server 120 may include both the anomaly detection/analysis module and the emergency decision maker 760. The emergency decision maker 760 may perform its determination function in real time, and the anomaly detection/analysis module 730 may perform its determination function in non-real time. The anomaly detection/analysis module 730 may be implemented via computer program code stored on a computer-readable storage medium in combination with computer hardware.

The second server 150 may make a notification of the occurrence of an emergency situation not only via the worker terminal 130, but also via other terminals accessed by workers at the fab. To this end, the second server 150 may be established as a communication system including an email system and/or a messenger system. The second server 150 may provide the result of the determination of the details of the emergency situation, or send evacuation orders, to terminals accessed by workers who are within a predetermined distance from the area where the emergency situation has occurred.

Once an emergency situation has occurred in a particular zone of the fab, the third server 160 may send an emergency alarm and location information of the particular zone to the message broker 750. The message broker 750 may transmit information provided by the third server 160 to the mobile robot 110. Alternatively, the mobile robot 110 may be dispatched to the particular zone based on the information provided by the third server 160. The third server 160 may send the emergency alarm and the location information of the particular zone directly to the mobile robot 110.

When dispatched to an area where an emergency situation has occurred, the mobile robot 110, the mobile robot 110 may collect information on the current situation of the area in real time and may provide the collected information to the first server 120. The third server 160 may be established as an integrated disaster prevention alarm system.

The message broker 750 may be implemented via computer program code stored on a non-transitory computer-readable storage medium in combination with computer hardware. The message broker 750 may provide sensing data collected by the mobile robot 110 to the emergency decision maker 760 and the Web UI 710. The emergency decision maker 760 may determine whether an emergency situation has occurred in the fab based on the sensing data provided by the message broker 750.

A mobile robot 110 and an unmanned inspection system 100, including the mobile robot 110, have been described so far with reference to FIGS. 1 through 25. The unmanned inspection system 100 is intended to inspect high-altitude spots in a plant or an infrastructure facility, and may be used with various inspection sensors mounted at the end of a telescopic lift. The mobile robot 110 may include a safety sensor for preventing collisions and a lighting device, etc. so that the tip of a telescopic lift may be inserted and used in a narrow space. For an unmanned inspection, a telescopic lift may be installed at, and used with, the mobile robot 110, which is capable of autonomous driving.

The mobile robot 110 includes a platform for autonomous driving, a telescopic lift, a safety sensor for preventing the collision of the telescopic lift, a rotation device for removing any interference areas that may be generated in images captured by cameras due to the presence of a safety sensor structure, and a lighting device for capturing images in a low-light environment. The unmanned inspection system 100 may include the mobile robot 110 and a first server 120, which is a server system for collecting/analyzing data.

According to embodiments of the present disclosure, data can be frequently acquired by inspecting high-altitude spots unattended. Such data can be an excellent source for data analysis (e.g., anomaly detection/analysis) and can also help the early diagnosis of any potential risks.

Also, labor cost can be reduced through unmanned inspections. Also, anomalies in inspection targets at high-altitude spots can be detected by capturing close-up images.

Also, anomalies in plants or factories can be detected based on accumulated data. Also, as various measurement/inspection results can be automatically converted to a data format, the amount of time taken to arrange data afterwards can be reduced. The present disclosure is applicable to the inspection of high-altitude spots in an FSF or CSF.

Exemplary embodiments of the present disclosure have been described hereinabove with reference to the accompanying drawings, but the present disclosure is not limited to the above-described exemplary embodiments, and may be implemented in various different forms, and one of ordinary skill in the art to which the present disclosure pertains may understand that the present disclosure may be implemented in other specific forms without changing the technical concept or features of the present disclosure. Therefore, it is to be understood that the exemplary embodiments described above are illustrative rather than being restrictive in all aspects.

What is claimed is:

1. An unmanned inspection system comprising:
a mobile robot configured to collect information regarding an inspection target using a first sensor package, which mobile robot includes the ability to inspect high-altitude locations in a semiconductor fabrication plant;
a first server configured to manage an inspection mission schedule of the mobile robot and to determine whether an emergency situation has occurred in the semiconductor fabrication plant based on the information collected by a high-altitude sensor of the mobile robot; and
a worker terminal connected to the first server and configured to generate the inspection mission schedule,
wherein:
the mobile robot is configured to conduct an unmanned inspection of the inspection target, which is located at the high altitude, while autonomously driving,
the mobile robot includes a telescopic lift, which is mounted on the outside of a main body of the mobile robot and is extendable in a height direction, the first sensor package, which is installed at an upper end of the telescopic lift, and a second sensor package, which is installed at the upper end of the telescopic lift,
the second sensor package includes a bumper sensor frame surrounding the first sensor package, and
the second sensor package is configured to detect a collision between the bumper sensor frame and an object at the high-altitude.

2. The unmanned inspection system of claim 1, wherein:
the first sensor package is configured to be moved to the high-altitude location by the telescopic lift to collect the information regarding the inspection target.

3. The unmanned inspection system of claim 1, wherein:
the second sensor package is configured to output one or more signals used to prevent the collision of the mobile robot with objects at the high-altitude location or with the inspection target.

4. The unmanned inspection system of claim 2, wherein:
the telescopic lift is stopped and the telescopic lift or part of the second sensor package is prevented, by the second sensor package, from colliding with an object at the high-altitude location or with the inspection target.

5. The unmanned inspection system of claim 1, wherein:
the bumper sensor frame includes a first ring, a second ring, which is disposed above the first ring, and a plurality of pillar members,
wherein:
the plurality of pillar members connect the first and second rings.

6. The unmanned inspection system of claim 5, wherein:
the mobile robot further includes a controller, which controls the driving of the mobile robot and the operation of the telescopic lift, and
the controller obtains a plurality of camera images by rotating the first sensor package and generates an image having removed therefrom a field-of-view (FOV) interference area caused by the presence of the pillar members, based on the plurality of camera images.

7. The unmanned inspection system of claim 1, wherein:
the mobile robot further includes a third sensor package, which is installed at an upper end of the main body, and
the third sensor package determines whether a posture of the mobile robot is horizontal to a floor.

8. The unmanned inspection system of claim 1, wherein the mobile robot further includes a pan-tilt unit, which controls a sensing area or a sensing direction of the first sensor package by moving the first sensor package.

9. A mobile robot comprising:
a telescopic lift mounted on the outside of a main body of the mobile robot, the telescopic lift being extendable in a height direction;
a first sensor package installed at an upper end of the telescopic lift; and
a second sensor package installed at the upper end of the telescopic lift,
wherein the mobile robot is configured to:
collect information regarding an inspection target, which is installed at a high-altitude location on a particular floor level of a semiconductor fabrication plant,
using the second sensor package, prevent the collision of the telescopic lift or the first sensor package of the mobile robot with the inspection target and/or stop the telescopic lift when the second sensor package collides with an object at the high-altitude location or with the inspection target, and
conduct an unmanned inspection of the inspection target, including autonomously driving,
wherein:
the first sensor package is configured to be moved to the high-altitude location by the telescopic lift to collect the information regarding the inspection target,
the second sensor package includes a bumper sensor frame that surrounds the first sensor package, and
the second sensor package is configured to send a signal when the bumper sensor frame collides with the object at the high-altitude location or the inspection target, and further comprising:
a controller configured to stop the telescopic lift based on receiving the signal.

10. The mobile robot of claim 9, wherein:
the bumper sensor frame includes a first ring, a second ring, which is disposed above the first ring, and a plurality of pillar members.

11. The mobile robot of claim 9, wherein:
the controller obtains a plurality of camera images by rotating the first sensor package and generates an image having removed therefrom a field-of-view (FOV) interference area caused by the presence of a portion of the bumper sensor frame that blocks the field-of-view, based on the plurality of camera images.

12. The mobile robot of claim 9, wherein the second sensor package is configured to determine whether a posture of the mobile robot is horizontal to a floor.

13. The mobile robot of claim 9, further comprising a pan-tilt unit, which controls a sensing area or a sensing direction of the first sensor package by moving the first sensor package.

14. An unmanned inspection method comprising:
collecting information, by a mobile robot, regarding an inspection target that is installed at a high-altitude location in a semiconductor fabrication plant;
managing by a first server an inspection mission schedule of the mobile robot and determining whether an emergency situation has occurred in the semiconductor fabrication plant based on the information collected by the mobile robot; and
generating the inspection mission schedule using a worker terminal,
wherein:
the mobile robot conducts an unmanned inspection of the inspection target by autonomously driving,
the first server determines the presence of potential risks in each zone of the semiconductor fabrication plant based on the information collected by the mobile robot and determines whether the emergency situation has occurred depending on the presence of the potential risks, and
the mobile robot patrols the inside of the semiconductor fabrication plant by using a first sensor package mounted on the end of a telescopic lift controlled by a controller of the mobile robot, the first sensor package surrounded by a bumper sensor frame connected to a second sensor package configured to detect a collision between the bumper sensor frame and an object at the high-altitude and send a signal indicating the collision to the controller.

15. The method of claim 14, further comprising:
stopping, by the controller, the mobile robot and/or the telescopic lift in response to receiving the signal indicating the collision.

16. The method of claim 14, further comprising:
obtaining, by the controller, a plurality of camera images by rotating the first sensor package and generating an image having removed therefrom a field-of-view (FOV) interference area caused by the presence of a portion of the bumper sensor frame that blocks the field-of-view, based on the plurality of camera images.

* * * * *